United States Patent
Falicoff

(10) Patent No.: US 7,859,754 B2
(45) Date of Patent: Dec. 28, 2010

(54) WIDEBAND DICHROIC-FILTER DESIGN FOR LED-PHOSPHOR BEAM-COMBINING

(75) Inventor: Waqidi Falicoff, Stevenson Ranch, CA (US)

(73) Assignee: Light Prescriptions Innovators, LLC, Altadena, CA (US)

( * ) Notice: Subject to any disclaimer, the term of this patent is extended or adjusted under 35 U.S.C. 154(b) by 579 days.

(21) Appl. No.: 11/982,492

(22) Filed: Nov. 2, 2007

(65) Prior Publication Data
US 2009/0116114 A1    May 7, 2009

(51) Int. Cl.
*G02B 1/10*    (2006.01)
(52) U.S. Cl. .................................... 359/588; 359/586
(58) Field of Classification Search ............. 359/588, 359/586, 580
See application file for complete search history.

(56) References Cited

U.S. PATENT DOCUMENTS

| | | | | |
|---|---|---|---|---|
| 4,770,496 A | * | 9/1988 | Mahlein | ...................... 359/588 |
| 4,896,928 A | * | 1/1990 | Perilloux et al. | ............. 359/359 |
| 5,999,321 A | * | 12/1999 | Bradley | ....................... 359/587 |
| 7,068,430 B1 | | 6/2006 | Clarke et al. | ................. 359/589 |

OTHER PUBLICATIONS

Semrock Quality Optical Filters 2007-2008 Catalog, p. 37.
https://www.omegafilters.com/index.php?page=tech_fd_ap, site visited Oct. 10, 2007.

\* cited by examiner

*Primary Examiner*—Joshua L Pritchett

(57) ABSTRACT

A general method is disclosed of designing two-component dichroic short-pass filters operable for incidence angle distributions over the 0-30° range, and specific preferred embodiments are listed. The method is based on computer optimization algorithms for an N-layer design, specifically the N-dimensional conjugate-gradient minimization of a merit function based on difference from a target transmission spectrum, as well as subsequent cycles of needle synthesis for increasing N. A key feature of the method is the initial filter design, upon which the algorithm proceeds to iterate successive design candidates with smaller merit functions. This initial design, with high-index material H and low-index L, is $(0.75\text{ H}, 0.5\text{ L}, 0.75\text{ H})^\wedge\text{m}$, denoting m (20-30) repetitions of a three-layer motif, giving rise to a filter with $N=2\text{ m}+1$.

19 Claims, 8 Drawing Sheets

WIDEBAND DICHROIC-FILTER DESIGN FOR LED-PHOSPHOR BEAM-COMBINING

STATEMENT REGARDING FEDERALLY FUNDED RESEARCH AND DEVELOPMENT

This invention was supported in part by the National Energy Technology Laboratory Award No. DE-FC26-05NT42341. The Government may have certain rights in this invention.

CROSS REFERENCE TO RELATED APPLICATIONS

This application is filed concurrently with U.S. patent application Ser. No. 11/982,480, of Falicoff et al. for "Optical Manifold," the disclosure of which is incorporated herein by reference in its entirety.

BACKGROUND OF THE INVENTION

The present invention relates generally to multilayer interference filters with thin-film specifications designed by a computer optimization program. The design methods disclosed herein related specifically to the commercial design package called the Essential Macleod, by the Thin Film Center, Inc. of Tucson Ariz., but could as well be performed by similar software packages or by a customized optimizer program.

In the field of fiber optics, the use of a multiplicity of discrete wavelengths arises in Wavelength Division Multiplexing (WDM), but those filters only need to operate over narrow ranges of wavelength and incidence angle. In illumination optics, however, the range of wavelengths and angles is much wider, making an efficient design much more difficult to generate. In general, optimization programs need to begin not far from a viable solution, so that proper selection of the initial trial design is vital to design success. Also, optimizers are easily stalled by excessive constraints, which can easily happen when the filter must operate at a wide range of incidence angles, as is typical in an illumination system. This kind of filter design has not been addressed by the prior art.

A new illumination task for a dichroic filter is combining the blue light of an LED and the yellow light from a photostimulated patch of phosphor into a single white output beam. Because both the blue and yellow light as they emerge from the LED and the phosphor are uncollimated, no presently-available filter can efficiently combine their light until the range of incidence angles has been restricted. The most geometrically convenient beam-combination angle is 45°, but unless the light is polarized only a narrow angular range can be accommodated without loss of efficiency, typically 42-48°, whereas a realistic illumination system will exhibit a 30-60° range of angles into the filter. This ±15° range, however, is relatively narrow as collimation range goes, and cannot be expected to be smaller. While a 45° angle of beam combination is well known from RGB displays, it has not been possible to overcome the severe polarization effects that occur at this angle. In order to overcome this, several RGB display systems were developed where the band-pass operates at less than 45°.

A well known system that operates at a nominal 30° is the so-called Philips color TV camera. This design became an industry standard and is based on U.S. Pat. No. 3,202,039. Another approach is given in U.S. Pat. No. 3,905,684. In this prior art the band-pass filter operates at a nominal angle of 16° and therefore is an improvement over U.S. Pat. No. 3,202,039, as it is much easier to design a short or long pass filter that operates about this incidence angle. A new system for combining un-polarized yellow and blue light based on a short-pass filter operating at a nominal incidence angle of 15° is revealed in the above-referenced concurrently filed U.S. Patent Application. The design method of the present invention was originally developed for designing a short-pass filter for the system revealed in that contemporaneously filed Application. The method can, however, be utilized wherever a wide-acceptance short-pass filter that operates between 0 to 30° is needed, such as in the system of U.S. Pat. No. 3,905,684.

In order to achieve high efficiencies, the short-pass filter employed in the contemporaneously filed application should, in addition to its short-pass functionality, act as a high performance reflector at incidence angles greater than 70°. Such a filter/reflector is not revealed in the prior art. It is well known how to achieve a high reflectance using total internal reflectance (TIR) by going from a high index of refraction layer to a low index of refraction layer. However, in this approach the low index layer must be thick enough to prevent frustrated total internal reflection. In order to not see this effect, the low index layer needs to be on the order of two wavelengths thick or for visible light a dimension of over 1000 nm is needed. However, in thin film designs the layers are typically a fraction of a wavelength thick, and the outer layer of the stack typically has to be optimized to a thickness to within a couple of nanometers to properly take into account the combined interference effects of all the layers.

Surprisingly, it was determined that using the design method described herein a solution is available in which at least one of the two outer layers of the stack for the short-pass filter is a low index layer, the thickness of which can be freely modified without affecting the characteristics of the original short-pass filter. By increasing the thickness of this low index layer (typically Silicon Dioxide) to approximately 1200 nm, both short-pass filter and reflector performance goals can be achieved. TIR is achieved by having a layer of a higher index medium, such as a glass cover or adhesive, before the thick low index first layer on the side of the filter on which the light to be reflected is incident, or in the other direction by having a high index layer (layer number two in the stack) followed by a thick low index layer (layer number one). The performance in the reflection mode is also excellent in both directions. In one direction (where the light is traveling from the substrate on which the filter is deposited, through the stack (starting at the layer numbered 80 in the Examples in the Tables below) to the thick layer (the layer numbered 1 in Tables 2 and 3) the reflectance is theoretically perfect at all angles above the critical angle for the materials. In the other direction (where the light is traveling from the adhesive or cover directly to the thick layer) the average reflectance for the same incidence angles as the other direction in the visible wavelengths is on the order of 99%. This is believed to be a novel configuration and not taught in the design of thin films in the prior art. In the configuration identified as optimal with reference to FIG. 8 of the drawings of the concurrently filed application, with the filter 8406 coated onto the underside of the exit prism 8407, the direction of theoretically perfect reflectance is the direction of the yellow light (500-700 nm), and the direction of theoretically 99% reflectance is the direction of the blue light (460 nm).

SUMMARY OF THE INVENTION

The afore-referenced concurrently filed patent application discloses an LED-phosphor beam-combiner based on a 15° primary incidence angle, with a total angular range of 0-30°. This is a relatively forgiving range of incidence angles, because the wavelength shift of the filter's dichroic performance curve of spectral reflectance (or transmittance) with incidence angle is relatively small at low incidence angles. Both the angular and polarization shifts are much smaller than for the 30-60° range of the 45° case. This reduced wavelength shift of the 15° embodiment contributes to ultra-high filter efficiency (95%) because the minimum-energy overlap between the blue LED spectrum and the yellow phosphor spectrum is at a wavelength of approximately 500 nm, where there is a notch in the resultant white spectrum.

Operating the filter at the notch wavelength (which can vary slightly in accordance with specific LED and phosphor spectra) will minimize the amount of inappropriately reflected long-wave blue light and inappropriately transmitted short-wave yellow light. The reflected blue light never reaches the phosphor, and the transmitted yellow light never joins the exit beam, so that filter efficiency is the product of both blue and yellow efficiencies, requiring them both to be above $\sqrt{95\%}=97.5\%$ to achieve 95% overall efficiency, a strong challenge when considering the range of incidence angles. As will be explained below, only the performances at 15° and 25° are used in the merit function used in optimizing the filter configuration. The inventor has found that the performance at these two angles is an adequate proxy for the overall performance within the range from 0° to 30°, and that imposing more constraints tends to prevent a good outcome.

Optical thin films are specified by a list of the layers, beginning in the medium of the incident light, for which a design goal has been established involving reflectance or transmittance as a function of wavelength. The last layer in the list is the one that is coated on the substrate, generally a substrate that is transparent to all wavelengths of interest. Where the incident light reaches the thin film filter through the substrate on which the filter is coated, the stack could be computed with the "adhesive" or "air" (depending on the design) as the "substrate" on the back side and a solid "medium" on the incidence side. If the resulting stack of layers is not reversible, the order of the layers may be appropriately reversed in preparing the instructions for coating onto the solid "medium." The reflectance of a nonreversible stack can be different in one direction compared to the other. A non-reversible stack may occur, for example, if the thicknesses of the layers are not in a symmetrical pattern and one or more of the materials used has an appreciable extinction coefficient. $Ta_2O_5$ is an example of a material having an extinction coefficient that is used in thin-film filters. This is a preferred material in this invention because, unlike titanium dioxide (which has a slightly higher index), it is highly transparent in the blue wavelength and has lower internal stress. These properties allow it to be used for designs that require many layers. Tantalum Pentoxide is also very compatible with SiO2. This combination has been used in the design and manufacture of filters for WDM applications, where stack of hundreds of layers is not uncommon.

Short-pass filters have the same transmission values in both directions even if the stack is not symmetrical and one or more of the materials has an extinction coefficient. The absorptance on the other hand does change as a function of direction. An example of an asymmetrical design having asymmetrical reflectance is provided in FIG. 3.1 of the book "Optical Thin Films" by J. D. Rancourt, SPIE Press 1996. Although the embodiments in this invention are asymmetrical stacks and one of the materials has an extinction coefficient, the major difference between the reflectance values in the two directions for a given incidence angle is primarily a consequence of the difference in the index of refraction of the substrate and medium and the optical system coupled to the filter. In most of the embodiments the substrate has a higher index of refraction than the medium (in some they are the same). Therefore, rays traveling toward the filter below the critical angle, will emerge on the other side at a lower incidence angle. The change in incidence angle can be calculated using Snell's law. In the aforementioned contemporaneously filed application, the optical system controls the angle of incidence of the rays striking the filter from either direction, such that the difference is less than the one based on Snell's law. This is why the reflectance can be higher in the direction toward the filter from the side with higher index material (substrate).

In deposition, the layers are successively deposited in the reverse order of the list. When considering light going outwards from the substrate, the reverse list can be used to analyze how it will propagate therein. The preferred embodiments of the present invention are two-component filters, comprising a low and a high refractive index. The filter specification can be made as a succession of letters, e.g., HLLLHL. Repetitions are designated as (HL)^m, for m repetitions of the same HL pair. The specification is completed by listing the thicknesses of each layer, either in physical units or optical thickness, relative to a reference wavelength. Units of one quarter of the reference wavelength are commonly used. The latter enables the same design to be scaled for different wavelength bands and/or for materials of different refractive index. For example, (0.75H, 0.25L)^10 would denote ten pairs of layers, each consisting of a high index layer 0.1875 wavelengths thick and a low index layer 0.0625 wavelengths thick where the wavelength is measured within the material in question, perpendicular to the plane of the layer. The wavelength used is a "reference wavelength," usually the wavelength at which an ideal filter would switch from transmission to reflection. For a real filter, the reference wavelength is substantially the midpoint of the transition from transmission to reflection for the central ray of the incident beam (in the embodiments, a 15° ray).

The huge number of possible combinations of up to 100 layers will highlight the value of a powerful optimization method when it finds a highly meritorious design. Part of the power of any method is its merit function and its initial, or seed, design. In general, design insight and control do not come from using many different refractive indices and thicknesses, but from using just the highest and lowest, and with only one thickness, to make (HL)^m. In particular, highly efficient preferred embodiment short-pass filters for the 15° beam combiner are derived from an optimization that began with the simple seed filter (0.75H, 0.5L, 0.75H)^m, where H is tantalum pentoxide (n=2.0462) and L is silicon dioxide (n=1.46), and the repetition number m is preferably 20 to 30. As is explained in more detail below, this results in a stack with the pattern HLHHLH-, etc., where HH is in effect a single double-thickness (1.5λ/4) H layer or an optical thickness of 0.375.

The number of layers N in the stack can be calculated once m is chosen, using the formula N=2 m+1. The filter for embodiments of the abovementioned 15° beam-combiner is short-pass, in that blue light is transmitted and yellow light is reflected. This seed filter, however, is band-stop, reflecting over a central range of wavelengths and transmitting the shorter and longer wavelengths. This seed filter exemplifies a first feature in the design methods disclosed herein—using as a seed filter a known edge-filter design with a spectrum that is the opposite of the one desired. This seed design is revealed for example on Baumeister, Phillip W., "Optical Coating Technology", SPIE Press, Birminghan Wash., 2004, pages 5-66, which is incorporated herein by reference in its entirety, and is essentially a long-pass design with ripples on either side of the transmission zone.

Also, Baumeister points out that having thicker high refractive index layers decreases the angle shift of a thin film. The design Baumeister provides, however, does not have a sharp slope in the primary transition zone, an important feature of embodiments of the short-pass filter described below. Nor does Baumeister provide any guidance as to how to make the long-pass filter achieve a tight slope while maintaining a low angle shift. Finally, the design in Baumeister is in fact for a filter which operates in air, yet the angle shift he shows is on par with the designs revealed herein, which operate inside a dielectric and where the media and substrate both have a high index of refraction. It is well known to those skilled in the art of designing short or long pass filters, that the angle shift can be reduced if the filter operates in air. Assuming the substrate of Baumeister's design has an index of refraction of 1.5, an incidence angle of 35° in air would be equivalent in terms of performance to an incidence angle of 22° inside the dielectric, reducing the cosine shift. With a filter in air there is refraction at the air/filter interface, so that the actual direction of the rays through the filter is steeper than the external angle of incidence. However, as is explained below, the "corrected" cosine shift for the design in Baumeister remains more than the cosine shift achievable by the filters described in the present application.

Reference is also made to Macleod, H. Angus, 'Thin Film Optical Filters', Institute of Physics Publishing, Philadelphia Pa., 2001 and to U.S. Pat. No. 5,812,405 to Meredith, which are incorporated herein by reference in their entirety.

A second feature is the use of a duplex target-spectrum, consisting of two transmission spectra, for two incidence angles within the desired range of small incidence angles, small here meaning 30° or less. The two angles used for the embodiment, 15° and 25°, have an inherent cosine shift of 6%, or 30 nm for an edge-wavelength near 500 nm. The target spectra, however, have only a 15 nm shift between them—500 nm at 15° and 485 at 25°, or half the cosine shift. This discrepancy imposes an additional constraint as compared with the first target spectrum alone, whereas specifying a full cosine shift would make the second target spectrum redundant. By comparison the design from Baumeister's book has an angle shift from 0° to 22° (equivalent to 35° in air) of 25 nm as can be seen in FIG. 5-88 in this book. This is more than double the 10 nm angle shift of one embodiment described herein, as can deduced by comparing curves 53 (0°) and 57 (20°) in FIG. 5a of this specification. This clearly demonstrates the advantage of the new design approach over prior art. Several of the new designs have been manufactured using ordinary vacuum evaporation coating equipment and the performance of the samples replicate the theoretical values. The overall performance of these samples was found to be on par with the finest rugate filters, or for some performance categories, outperforming them. The equipment needed to produce a rugate filter is very sophisticated as it must continuously vary the index of refraction of the layers. Such filters are therefore very expensive to manufacture and can be produced by only a handful of companies in the world. By comparison, the designs revealed herein are easily produced with industry-standard coating equipment.

Another parameter used to predict and characterize the angle shift of thin filters is the so-called effective index of refraction $n_{eff}$. The higher is its value, the lower is the angle shift for a given angle of incidence as compared with the value at zero incidence angle. The equation gives the new position for the start of a short-pass or long-pass transition zone $\lambda_\theta$ as a function of the transition position on the spectral response curve at zero incidence angle $\lambda_0$, the angle of incidence of a ray $\theta$, and the effective index of refraction $n_{eff}$. The equation is:

$$\lambda_\theta = \lambda_0 \sqrt{1 - \left(\frac{\sin(\theta)}{n_{eff}}\right)^2}$$

The transition feature most commonly quoted in the industry and used in the above equation is the 50% transmission point. This equation is given by several industry sources such as the 2007-2008 Catalog of Semrock of Rochester, N.Y. A similar definition is provided on the website of www.omega-filters.com. According to Dr. Angus Macleod, who is a noted expert in the field of thin films, the parameter $n_{eff}$ is implicitly defined by this equation (private communication). There is no direct way of accurately calculating this parameter independent of this equation. Dr. Macleod said an approximate value can be estimated by taking the square root of the product of the lowest and highest index materials used in the stack. So for a stack with the materials $SiO_2$, n=1.46, and $Ta_2O_5$, n=2.05, the effective index would be equal to 1.73. This is a typical value for a well designed filter. Numbers above this value have superior performance.

Dr. Macleod also states that he believes that the value of the effective index should not be higher than the highest index material in the stack. So a non-polarizing design with an effective index of refraction at or near the index of the highest material in the stack is operating near the theoretical limit. In the case of a stack using $Ta_2O_5$ with an index of refraction for most wavelengths the theoretical limit would be approximately 2.14 (near the limit for some depositions of $Ta_2O_5$).

The parameters provided by Semrock in their catalog are for filters which operate in air. The designs in the present specification are all immersed in a dielectric. Therefore, to use this formula one must correct the angle of incidence in the dielectric using Snell's law. For example an incidence angle of 39.97° in air would be equivalent to an incidence angle of 25° in a dielectric having an index of refraction 1.52 resulting in 15% less angle shift. Semrock claim to have the highest performing short-pass and long-pass filters in the industry, the so-called "Razor-Edge" filters. They give typical values for the effective index of refraction for the Razor-Edge long-pass filters as 2.08 for s-polarized light and 1.62 for p-polarized light. For the case where the both polarization states are included (the non-polarizing case) it can be assumed that the lower of the two values would apply or at best the average of the two or 1.85. They also state that these numbers, the tables and the equations can be used for their other filters, such as the Razor-edge short-pass filters. They state that "Because the designs are so similar for all of the Razor-Edge filters design for normal incidence (see page 38 of the 2007-2008 Semrock Catalog), the set of curves in the graph can be applied approximately to any of the filters." Additionally, they state "For LWP [long-pass filters] filters, the edge associated with s- and p-polarized light shifts more than the edge associated with s-polarized light, whereas for short-wave-pass (SWP) filters the opposite is true." Therefore, using an effective index of 1.85 for short-pass filter should be optimistic value for Razor-Edge short-pass filters from Semrock. These filters are recognized as being representative in the industry as the "state-of-the-art".

Using the above equation for the embodiment in Table 1 of this invention, we can estimate the effective index of the design at the reference wavelength 520 nm, where the angle of incidence shifts from 0° to 25° inside a dielectric with an index of refraction of 1.52. In this instance the equivalent angle of incidence is as stated previously, 39.37°. The transition zone for this non-polarized (includes both p and s states) design moves from 514 nm at zero incidence to 486 nm at 25° (inside the dielectric). So in this case $\lambda_0$ is equal to 514 nm, $\lambda_\theta$ is 486 nm. Using 39.37° for the incidence angle and solving for the effective index of refraction in the above equation, we obtain a value of 1.973. This value is considerably better than the ones quoted by Semrock in their catalog and is close to the theoretical limit for a stack using $SiO_2$ and $Ta_2O_5$ n=2.046. In this instance the index of $Ta_2O_5$ is 2.046, an effective index of 1.973 is over 97% of the theoretical maximum value. Using a higher index for the substrate of 1.64, as is the case in several of the designs in the invention, the effective index would be even higher, 2.13. (Slightly above the theoretical limit. Most likely, as a consequence of the approximate nature of the equation and the round-off to the nearest nm of the data input to the equation.) For the design of Table 3, with a thick first layer of $SiO_2$, $\lambda_0$ is equal to 513.5 nm, $\lambda_\theta$ is 485.5 nm, resulting in an effective index of 1.972 (inside a dielectric of 1.52). The effective index of the design of Table 3 is the same as the design of Table 1, 1.973. This illustrates the advantage of the new design and design approach compared with the prior art. It operates at or very near the theoretical limit in terms of minimizing the angle shift for the given materials of $SiO_2$ and $Ta_2O_5$.

A further confirmation of this fact can be obtained if one modifies the medium and substrate for the design of Table 1, where air is now the medium, and the substrate has an index of 1.64. The design still behaves as a high performance non-polarizing short-pass filter with a few percent losses in the transmission zone. The effective index is determined by the angle shift of the filter from 0° incidence to 39.37°, as the incident rays are now in air. In this case $\lambda_0$ is equal to 513 nm, $\lambda_\theta$ is 486.5 nm, and the effective index is 1.99, 97.7% of the theoretical maximum value and well above the short-pass filter designs of Semrock and the prior art.

If a higher index material than $Ta_2O_5$ is used in the design, then the effective index could be increased, reducing the angle shift. However, this may come at a price in performance for other targets. Using $TiO_2$, for example, the effective index can be increased but at the expense of a reduced transmission in the blue wavelengths compared to the designs using $Ta_2O_5$. This may not a problem for some applications that operate at the longer wavelengths.

Another way one can compare the performance of the embodiments of this invention to the prior art, such as the best short-pass filters from Semrock, is to directly compare the angle shift of the transition zone. For example, on pg. 37 of the aforementioned catalog, the top graph on the page shows the relative wavelength shift as a function of the angle of incidence where the relative wavelength is defined as the fraction, $\lambda/\lambda_\theta$. The higher this fraction (1.0 represents no angle shift), the lower angle shift for a given incidence angle and therefore the higher performance. For the design of Table 1, the relative wavelength shift is 486/514 or approximately 0.95. This is for a corrected incidence angle of 39.37°. This is the same value as the Semrock nonpolarizing design when the incidence angle is 30°. This is approximately a 9° improvement in performance over this prior art.

The Semrock designs typically require many more layers than the embodiments disclosed in the present specification. According to the catalog, the Razor-Edge filters are covered by U.S. Pat. No. 7,068,430. An embodiment for a short-pass filter is provided in Example 2 in this patent. The design consists of 180 layers alternating between $Ta_2O_5$ and $SiO_2$. This is 100 layers more than the designs from Tables 1 to 4 hereinbelow. In addition, the manufacturing approach of U.S. Pat. No. 7,068,430 requires the technique of continuous optical monitoring, whereas the embodiments in this invention can be manufactured using standard crystal monitoring procedures, a much more common approach. In fact other than the improved steepness of the edge of the short-pass filter that is possible with using 180 layers, the design of U.S. Pat. No. 7,068,430 does not outperform the designs in this invention for a number of key parameters. For example, if one compares the measured transmission curve 902 of FIG. 9 of U.S. Pat. No. 7,068,430 with curve 53 of FIG. 5*a* of this invention (representative of the actual measured values of this design), both short-pass filters operating at an angle incidence of 0°, there is little difference in the two in the transmission zone. The 80 layer design may in fact have a slight edge over the other near the transition zone. The improved steepness of the transition zone of the 180 layer design is expected. The difference in the reflection zone is also small as the 80-layer design achieves 99% reflectance from 525 nm to nearly 700 nm.

It is well known to those who are skilled in the art of thin film design that the width of the reflection zone can be widened by increasing the number of paired layers in the filter. An 80-layer stack is sufficient for handling approximately 200 nm, from 500 to 700 nm. (If more bandwidth is required then a design having more than 80 layers can be chosen using the method described herein.) Equations for calculating the bandwidth of the reflection zone of a filter, as a function of the number of layer pairs, are given in many texts on the subject. For example, pg. 63 of the book "Field Guide to Optical Thin Films" by R. Willey, SPIE 2006 explains how this is calculated. On pg. 64 of the same book it is shown how the edge slope for bandpass filters "between the pass and block band of an edge or bandpass filter (LWP or SWP)" is calculated. The figure at the bottom of that page shows how the slope increases as the number of pairs increase. (It only shows up to 20 pairs) So it expected that a design of 180 layers can achieve a very steep slope at the transition zone as well as having high reflectance over the entire reflectance zone of the filter. The problem with the approach used by U.S. Pat. No. 7,068,430 is that the angle shift problem is not addressed. So the design works very well for collimated light from a source such as a laser but it is not so good when there is a wider beam angle such as 25° to 30° full angle. In this case the steep edge slope at each angle of incidence does not help as the angle shift cancels out much of this benefit. This issue is addressed in the present invention.

The high-index material tantalum pentoxide used in the preferred designs, although having a lower index than titanium dioxide, has an advantage over this commonly used high index coating material in that it has lower absorption in the blue wavelengths. Therefore, it is preferred material when a design calls for many thick layers. As was stated previously this is well known to those who design filters for the WDM industry. To achieve the highest performance for the preferred embodiments, the highest purity tantalum pentoxide was used. In the applicants' tests, the material used was PATINAL® tantalum pentoxide from EMD Chemicals Inc. of Gibbstown, N.J.

The concurrently-filed patent application describes an embodiment of a remote-phosphor white-light source that has a 5-32° range of incidence angles upon the dichroic filter. In addition, the filter totally internally reflects light on both sides that is at grazing incidence angles (75° or more). For this added function, an embodiment is disclosed in the present application with an added thick layer of low-index material, where thick means that it suppresses the transmission of the evanescent waves upon which the transmission of light by frustrated TIR depends. Suppression of the evanescent wave sufficient that 98% or 99% of the light in the glancing rays is totally internally reflected is achievable in certain embodiments.

According to one embodiment of the invention, there is provided a thin-film dichroic short-pass filter comprising alternating layers of two materials, one of low index of refraction and the other of high index of refraction, and the filter has an effective index of refraction of more than 95% of the index of refraction of the high index material over the operating wavelength of said filter.

According to another embodiment of the invention, the filter may designed and manufactured by a method in which the number and individual thicknesses of the layers are specified by a design. The design is determined by an optimization method comprising providing a seed filter with formula $(0.75H, 0.5L, 0.75H)\hat{\ }m$, m being 20 to 40. A short-pass target-spectrum is defined with a desired edge-wavelength and at least one desired wavelength range, the edge-wavelength specifying the transition from transmittance to reflectance. The at least one desired wavelength range includes a spectral transmittance range below the edge-wavelength and a spectral reflectance range above the edge-wavelength, or vice versa for a long-pass filter. The seed filter is optimized by a method comprising repeated steps of generating and evaluating a candidate filter design from the design of a previous step, the steps starting with the seed filter and concluding with the dichroic filter. The evaluating steps use a merit function comprising a weighted sum over the at least one wavelength range of the difference between the target-spectrum and the transmission spectrum of the candidate filter design. The spectral transmittance range and the spectral reflectance range may be separated by a range including the edge wavelength that is ignored or given lower weight.

According to a further embodiment of the invention, there is provided a dichroic filter comprising at least 78 layers having optical thicknesses that are within 2% of the optical thickness of layers in the same order in the filter of any of Tables 1 to 4 below.

According to a further embodiment of the invention, there is provided a dichroic filter operable upon unguided light transiting therethrough, the filter comprising alternate layers of higher and lower refractive index, wherein an outermost layer of said lower refractive index has its thickness increased to at least the 2% evanescent-wave coupling-decay depth.

According to a further embodiment of the invention, there is provided a non-polarizing short-pass dichroic filter comprising an alternating stack of two materials, one of low index of refraction and the other of high index of refraction; wherein at least 3 percent of the high index layers of said filter have a thickness not less than 300 nm and the filter has an effective index of refraction greater than 1.95 and/or greater than 95% of the refractive index of the high index of refraction material.

BRIEF DESCRIPTION OF THE DRAWINGS

The above and other aspects, features, and advantages of the present invention will be more apparent from the following more particular description thereof, presented in conjunction with the following drawings wherein.

DETAILED DESCRIPTION OF THE DRAWINGS

Reference will now be made in detail to various embodiments of the present invention, examples of which are illustrated in the accompanying drawings. The embodiments are described by way of explanation, and not by way of limitation.

Figure 1:
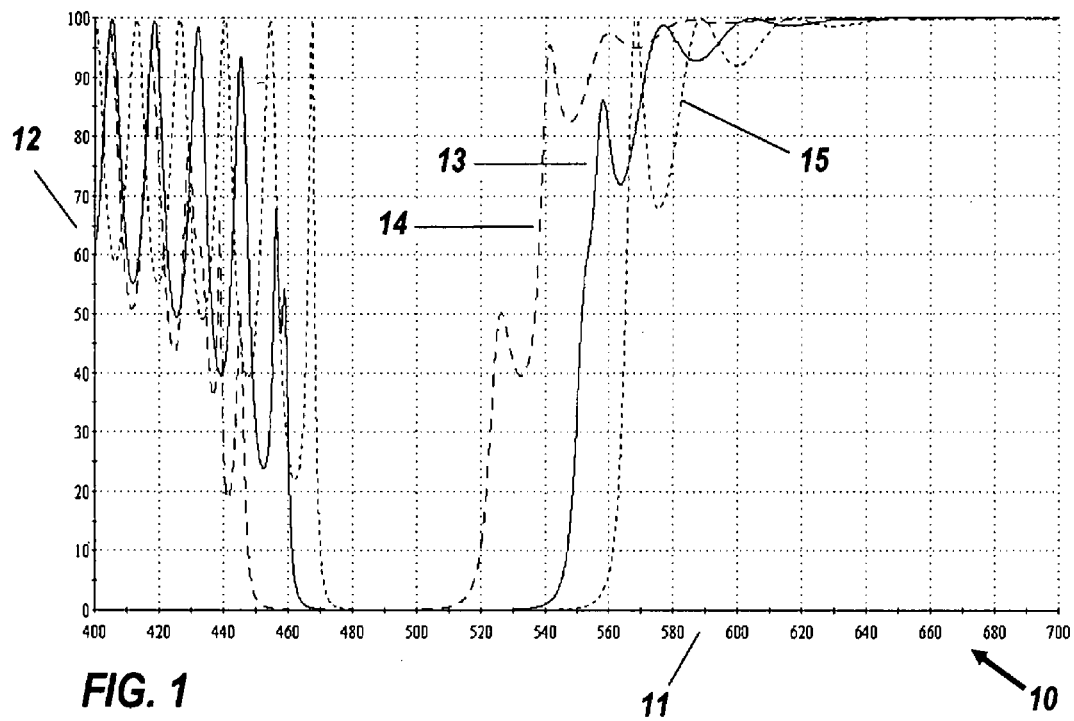
FIG. 1 shows the transmission spectrum of a 41-layer initial design candidate, a band-stop reflector, at three incidence angles.

FIG. 1 shows a spectral transmittance graph 10 with horizontal wavelength scale 11 in nanometers (nm) and vertical transmittance scale 12 in %, for the m=20, 41-layer seed filter $(0.75H, 0.5L, 0.75H)\hat{\ }20$. Solid curve 13 is the transmittance for 15°, dashed curve 14 to its left is for 25°, and dotted curve 15 to its right is for normal incidence. As may be send in FIG. 1, there are minor changes in the shape of the curves, showing that they do more than shift in frequency when the incidence angle is changed.

Figure 2:
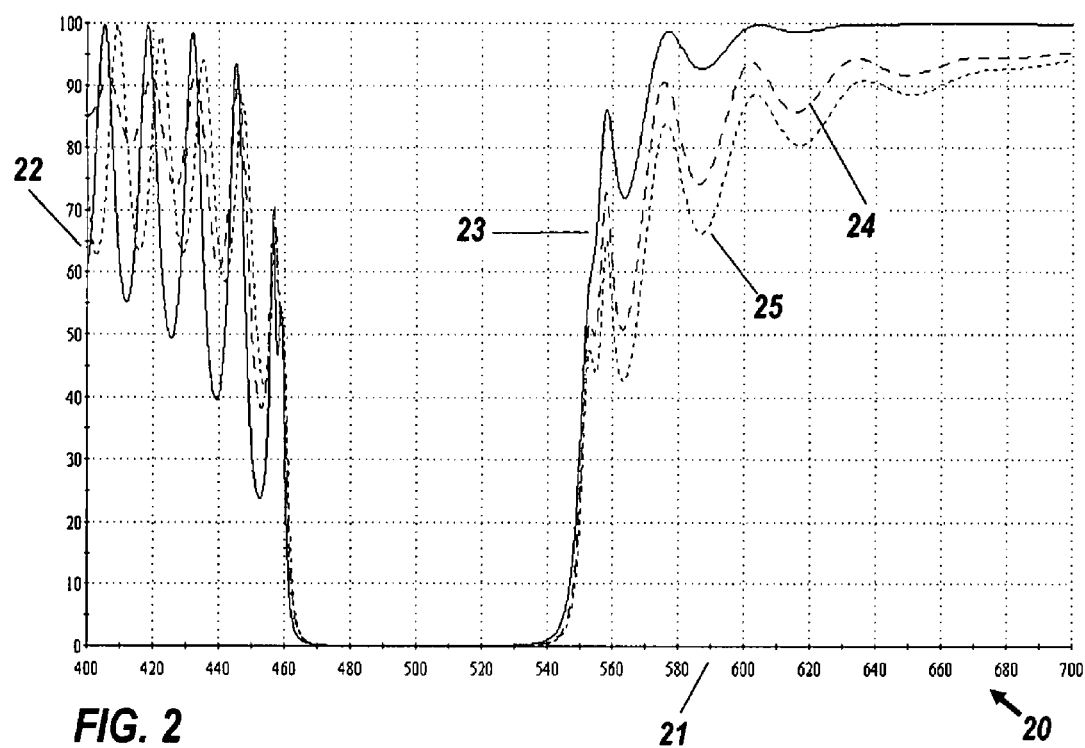
FIG. 2 shows the spectrum at one angle along with its variation as two layers are varied.

FIG. 2 shows spectral graph 20 with horizontal wavelength scale 21 in nanometers (nm) and vertical transmittance scale 22 in %, for the m=20, 41-layer seed filter. Solid curve 23 is the transmittance for 15° (the same curve, for the same filter, as curve 13 of FIG. 1). Dashed curve 24 is the transmittance for a filter differing from the filter of curves 13 and 23 by a doubling of the thickness of the first layer, and dotted curve 25 is the transmittance for a filter differing from the filter of curves 13 and 23 by a doubling of the second layer. In the interests of clarity, FIG. 2 shows, represented by the differences between the three transmittance curves, the sensitivity curves for only the first two of the N layers, rather than all of them, and at only one frequency. Each of the N sensitivity curves represents a wavelength-by-wavelength plot of the partial derivative of filter response with respect to change in layer thickness. At each wavelength these N sensitivity curves represent an N-dimensional vector that is mathematically defined as the gradient, or direction of maximum increase in filter transmittance.

The target filter value at that wavelength may require a reduction in transmittance, so that the gradient is not always the desired direction (which defines the 'conjugate' gradient vector). In conjugate-gradient filter optimization there is a set of weights that expresses the relative importance of the various wavelengths expected to be incident upon the filter. For example, weights could be made proportional to the spectral emittance of a photostimulative blue LED and of the phosphor it stimulates. At each wavelength there is also the spectral transmittance of the desired target filter. The conjugate-gradient technique utilizes the known gradients across the wavelengths of filter operation, weighted to combine all the gradients into one. From it can be calculated the N changes in the layers (i.e. an N-vector) that will maximize the change of the entire weighted filter curve towards the target filter curve. The resultant set of layer changes is implemented step by step to transform the initial seed filter into the closest possible approximation of the target filter After that it is time to add more layers, via the next step, of needle synthesis. Needle synthesis is a software design technique by which a thin layer (needle) of material is moved through a design and inserted at the point where a merit function is most improved.

Figure 3:
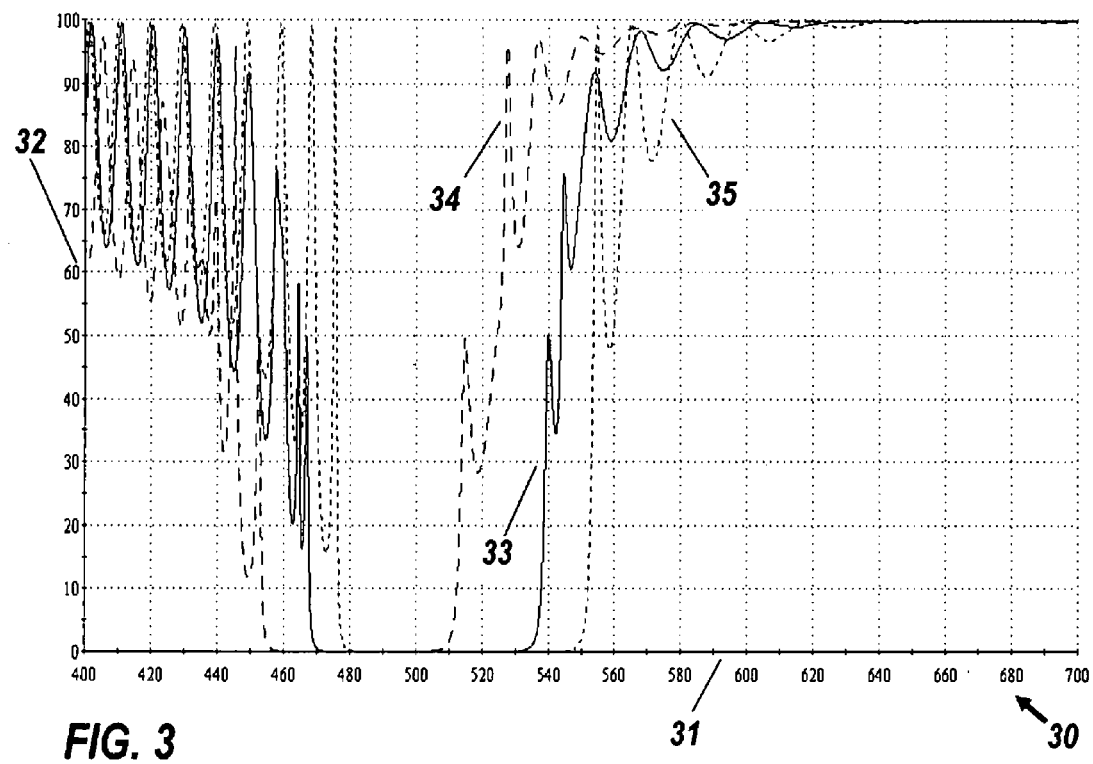
FIG. 3 shows the transmission spectrum of a 61-layer initial design candidate, a band-stop reflector, at three incidence angles.

FIG. 3 shows spectral transmittance graph 30 with horizontal wavelength scale 31 in nanometers (nm) and vertical transmittance scale 32 in %, for the m=30, 61 layer seed filter using the seed formula (0.75H, 0.5L, 0.75H)^30 at the reference wavelength of 520 nm. Solid curve 33 is the transmittance for 15° incidence angle, dashed curve 34 to its left is for 25°, and dotted curve 35 to its right is for normal incidence.

Figure 4:
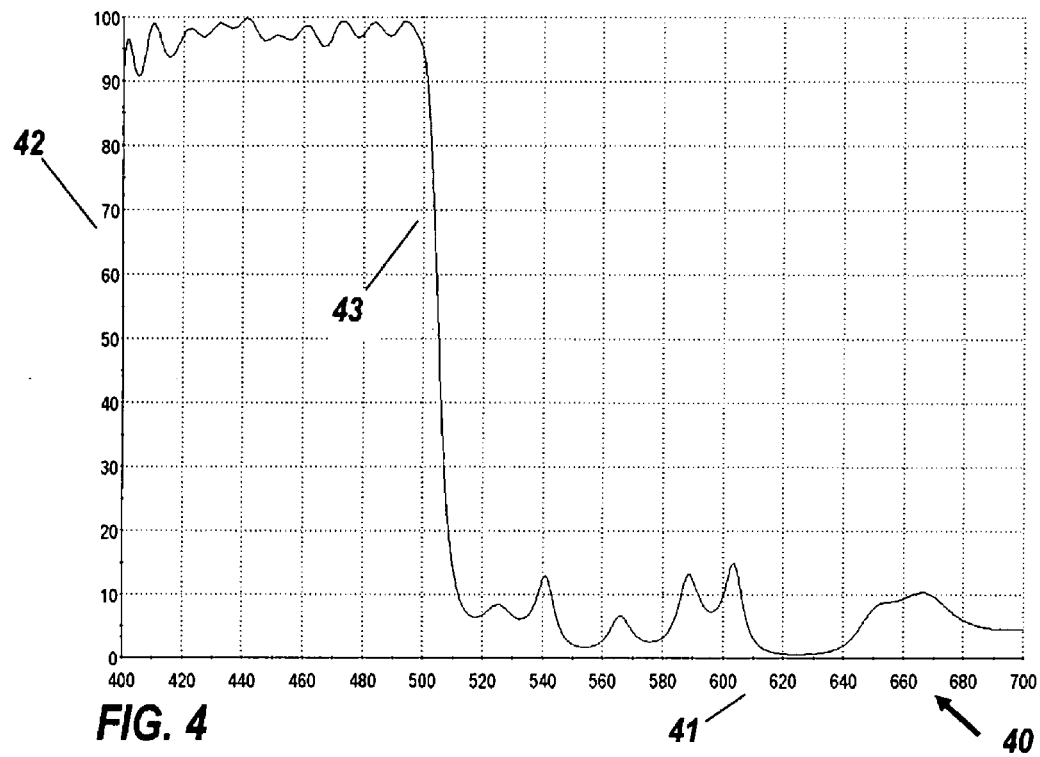
FIG. 4 shows the spectrum at one angle of an interim design after conjugate gradient optimization is carried on the 41-layer initial design candidate of FIG. 1.

FIG. 4 shows spectral graph 40 with horizontal wavelength scale 41 in nanometers (nm) and vertical transmittance scale 42 in %, for the filter obtained after conjugate gradient optimization is performed on the 41 layer seed design of m=30 of FIG. 3 to convert the long-pass design to a short-pass using the described targets for the conjugate gradient. One can also start the design process using a value for m equal to 20 as shown in FIG. 1. The resulting final designs will be nearly the same with minor variations in thicknesses and the number of layers.

Solid curve 43 is the transmittance for 15°. Note how the shape of the filter has the characteristics of a short-pass filter, albeit with some room for improvement. The targets used to achieve this interim design are discussed in detail in the description of the algorithm for FIG. 10.

Figure 5A:
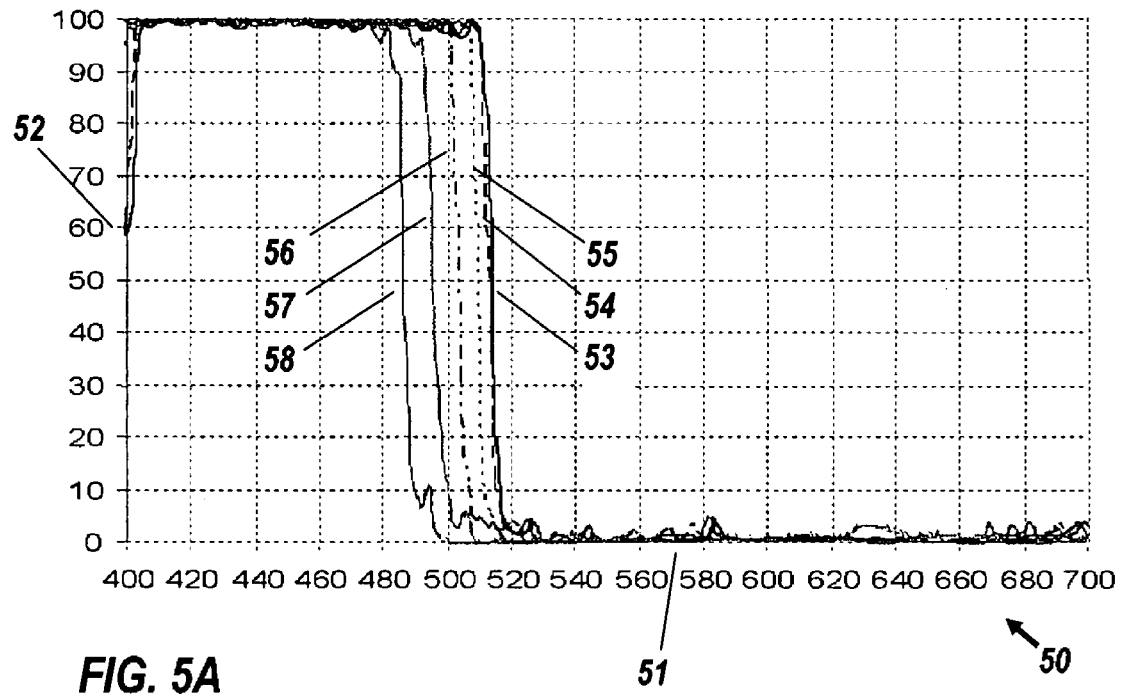
FIGS. 5A and 5B shows the spectrum of a preferred 80-layer dichroic filter listed in Table 1.

FIG. 5A shows spectral graph 50 with horizontal wavelength scale 51 in nanometers (nm) and vertical transmittance scale 52 in %, for the final 80 layer dichroic filter shown in Table 1 after needle synthesis and subsequent further conjugate gradient optimization are performed. Solid curve 53 is the transmittance for normal incidence, and barely differing from it is dashed curve 54 for 5°. Close by is dotted curve 55 for 10°, broken curve 56 for 15°, solid curve 57 for 20°, and leftmost solid curve 58 for 25°. This design assumes that the medium and substrate surrounding the filter are the same material with an index of 1.52. The design works nearly as well if a higher index substrate is substituted such as PBM2Y glass from Ohara Inc. of Kanagawa, Japan. If a new design is required with a substrate having a higher index, the design of Table 1 can be optimized using either conjugate gradient or simplex and replacing the old substrate with the new. No change is needed to the targets.

Figure 5B:
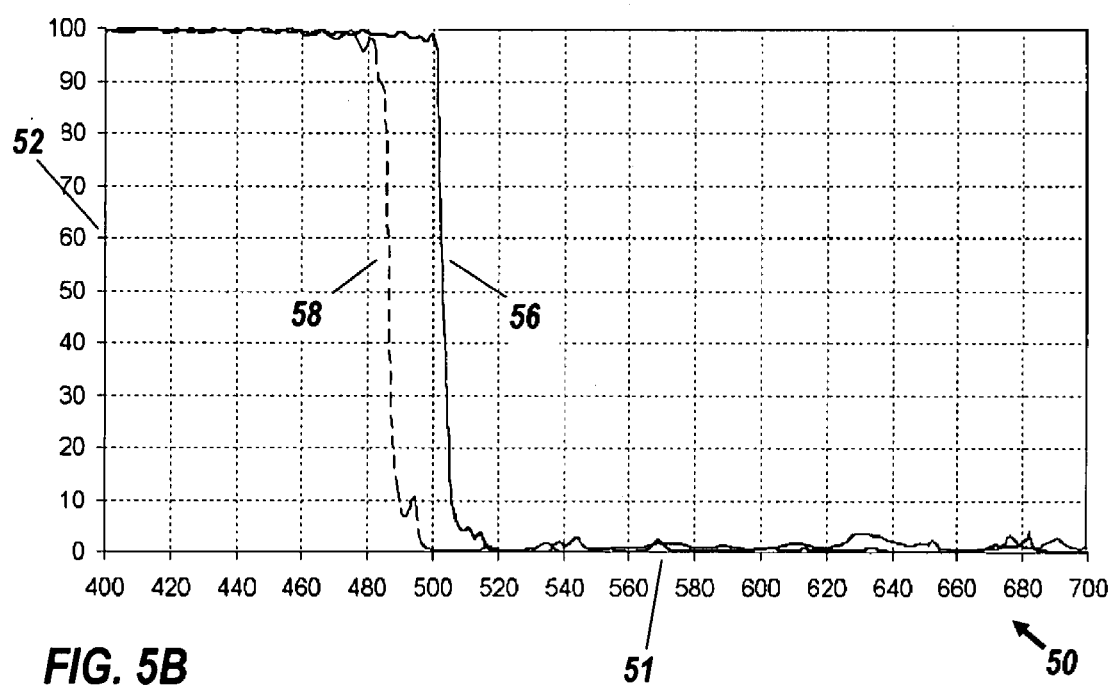

FIG. 5B shows curves 56 and 58 of FIG. 5a, the curves on which the optimization is based, isolated for clarity. In FIG. 5b, curve 56 is shown solid, and curve 58 to its left is shown dashed. These curves ended up precisely where they were specified for the optimization.

Figure 6A:
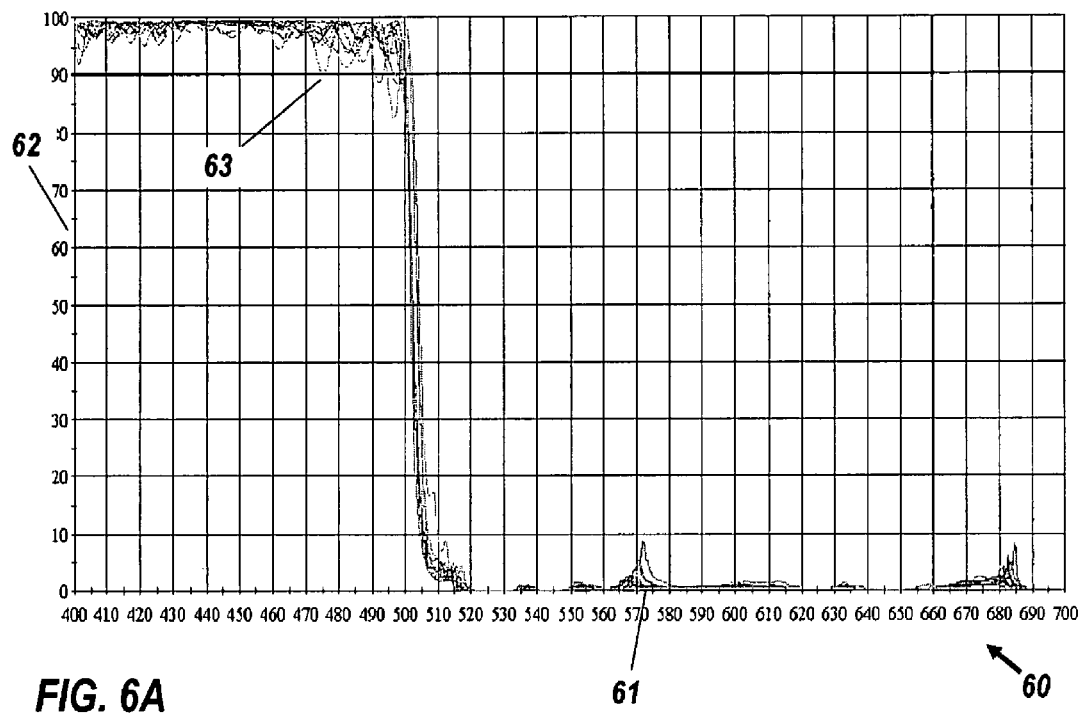
FIG. 6A shows the effects of manufacturing variations in a filter at 15° incidence angle.

FIG. 6A shows spectral graph. 60 with horizontal wavelength scale 61 in nanometers (nm) and vertical transmittance scale 62 in %, for the final 80 layer dichroic filter of Table 1 at 15° incidence angle. Multiple curves 63 are for ten variations of the design generated by randomly changing all layer thicknesses and indices, with a Monte-Carlo normal distribution of sigma 1%. These curves are representative of what would be expected of actual samples manufactured at that error level.

Figure 6B:
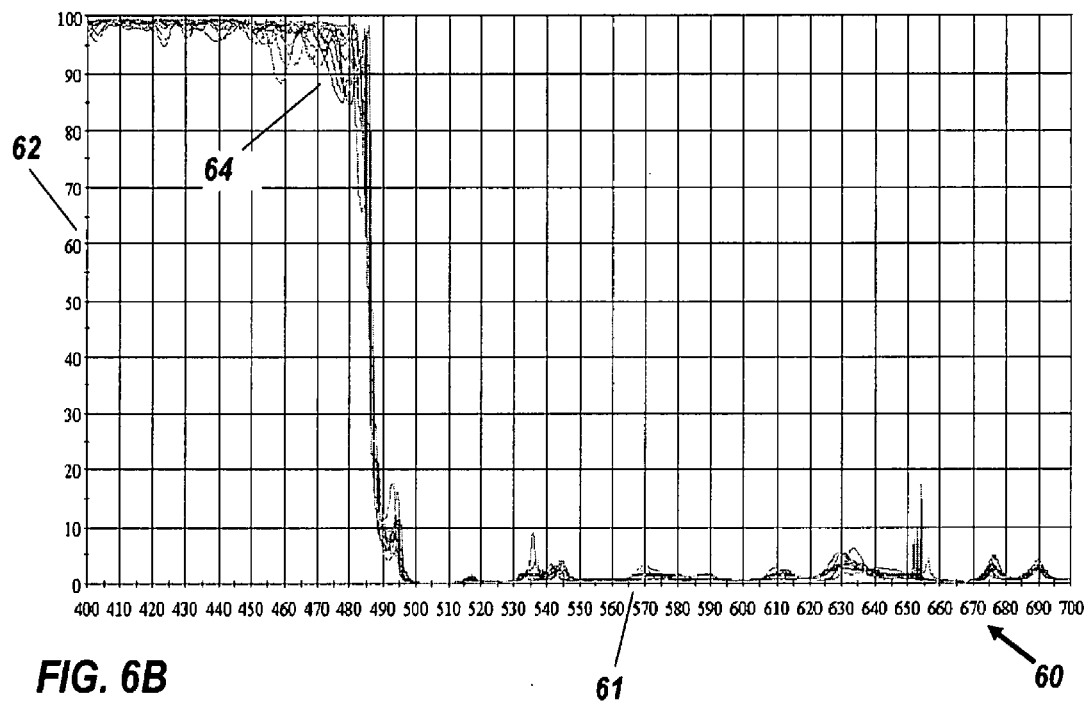
FIG. 6B shows the effects of manufacturing variations in a filter at 25° incidence angle.

FIG. 6B shows spectral graph 60 and multiple curves 64 for 25° incidence.

Figure 7:
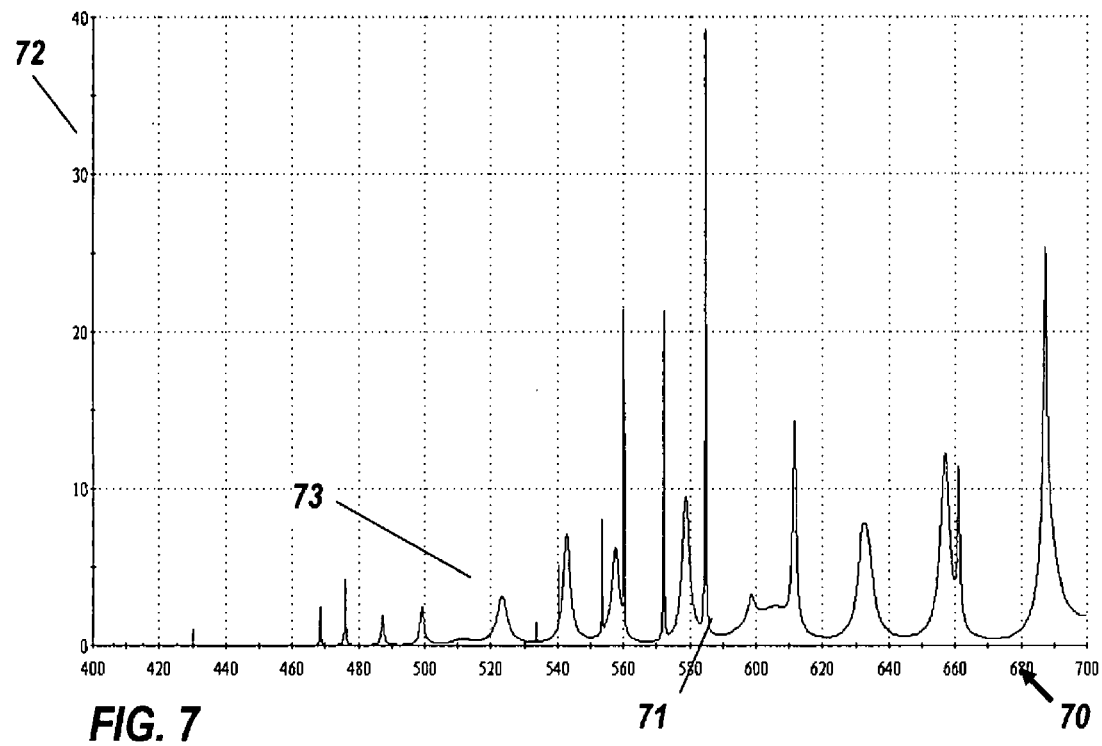
FIG. 7 shows the effects of manufacturing variations in a filter at 75° incidence angle, for beam guidance.

FIG. 7 shows spectral graph 70 with horizontal wavelength scale 71 in nanometers (nm) and vertical transmittance scale 72 in % (but only to 40%), for the final 80 layer dichroic filter of Table 3. Solid curve 73 is the transmittance for 75° in the direction of the glass medium, showing very small transmittance, as desired for attaining high internal reflectance. In the substrate direction with the higher index material (Ohara PBM2Y has an index above 1.6) there is 100% reflectance for rays striking the filter above 70° incidence angle.

Figure 8:
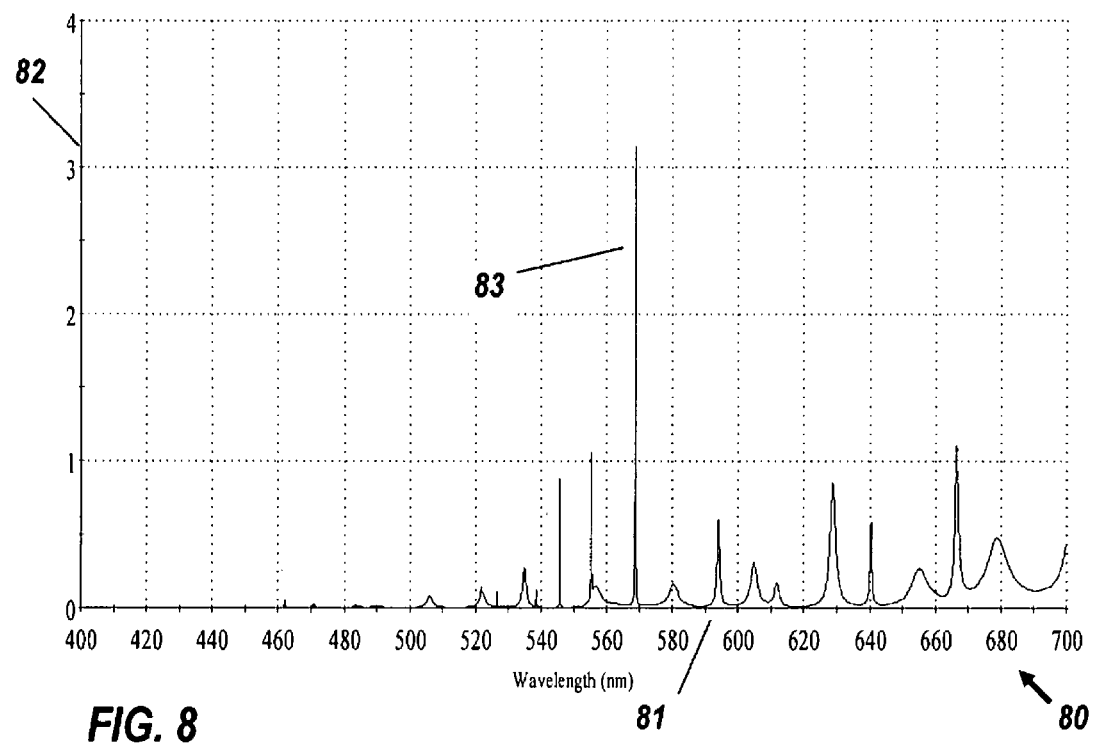
FIG. 8 shows the effects of manufacturing variations in a filter at 80° incidence angle, nearly TIR.

FIG. 8 shows spectral graph 80 with horizontal scale 81 and vertical scale 82 (but only to 4%) for the same design. Solid curve 83 is the transmittance for rays at an 80° incidence angle traveling from the medium (index of 1.52) toward the filter. The peak transmittance is a small spike of 3% at approximately 570 nm. There is perfect TIR, to within the accuracy of the calculations, in the reverse direction at all angles above 70° incidence angle.

Figure 9:
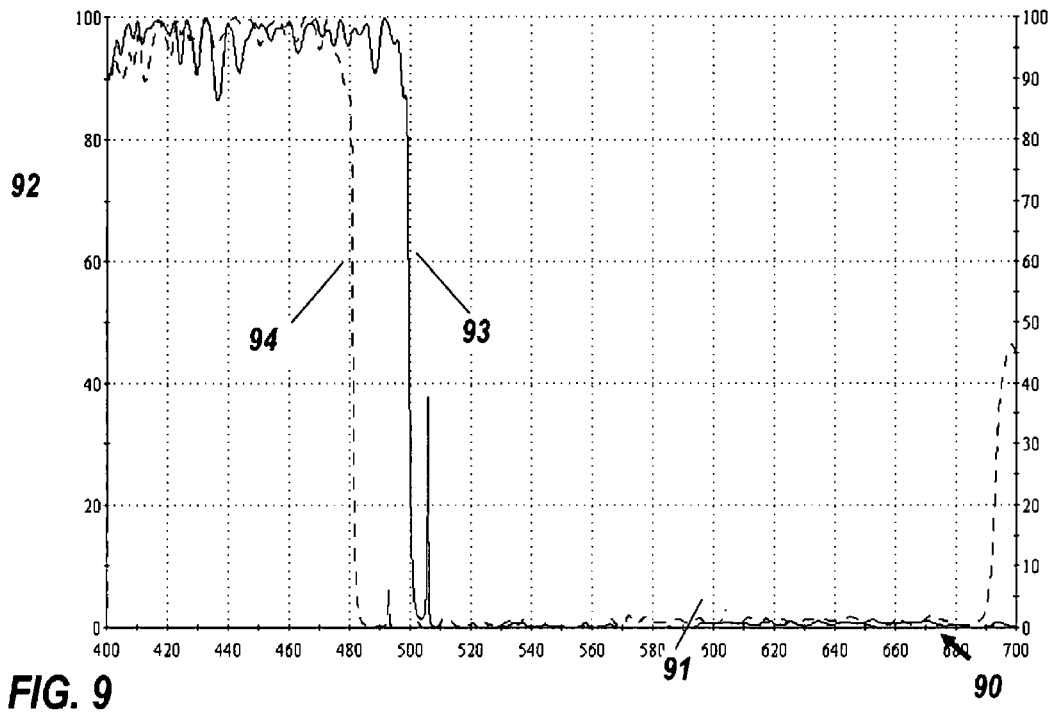
FIG. 9 shows the transmission spectrum of a filter designed with variable weights.

FIG. 9 shows spectral graph 90 with horizontal wavelength scale 91 in nanometers (nm) and vertical transmittance scale 92 in %, for a dichroic filter designed with weights given by the spectra of a typical blue LED and a typical yellow phosphor. Solid curve 93 is the transmittance for 15° and dashed curve 94 to its left is for 25°. As compared with FIG. 5b, the cliffs are much steeper, but at the price of some transmission around 700 nm, where the human eye is insensitive, and some reflection around 400 nm, where the blue LED has little light. Also, to the right of each cliff are small spikes, allowed because there is little radiation at these wavelengths. These artifacts can be removed by using unit weights at all wavelengths between the LED's blue peak at 455 nm and the phosphor's yellow peak at 540 nm.

Figure 10:
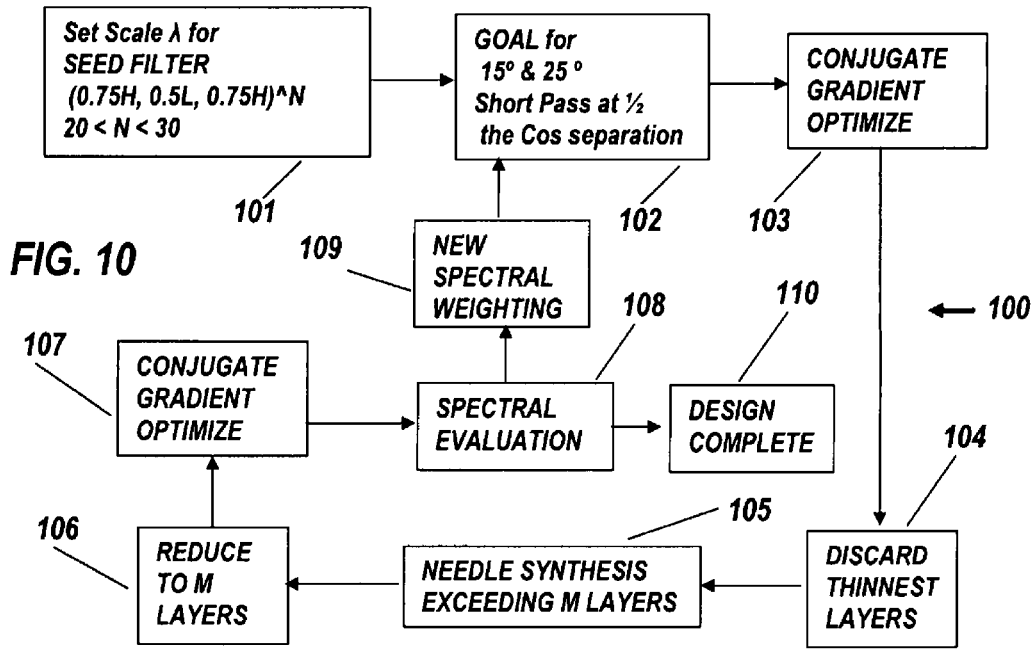
FIG. 10 shows a flow chart of a design method.

FIG. 10 is a simplified flow chart of the algorithm. A more detailed description follows. The algorithm 100 can be defined into several distinct steps. First in step 101, the seed equation is put into a suitable thin film design program. The inventors used the computer software Essential Macleod from Thin Film Center of Arizona. However any equivalent package can be used. In an embodiment, the seed equation, in the notation explained above, is (0.75H, 0.5L, 0.75H)^m, where m is greater than or equal to 20 and less than or equal to 40. The H in this formula represents one quarterwave optical of tantalum pentoxide. Therefore, 0.75 H would represent an optical thickness of 0.1875 wavelengths. This is doubled for the interior layers of tantalum pentoxide to 0.375.

The L in the formula is one quarterwave optical. Therefore, 0.5 L is equal to an optical thickness of 0.125 wavelengths. In an embodiment, the reference wavelength is set to 520 nm to replicate the design of a short-pass filter for the inventors' remote phosphor systems. For other applications a different reference wavelength may be chosen. Next, in step 102 the targets are input to the program. For a system which must accommodate incidence beam angles from 0° to 30°, one target may be set for 15° incidence angle and the other at 25°. (More generally, the targets may be set at the mean of the two extreme incidence angles and 5° less than the highest incidence angle.) For the 15° target the transmission zone may extend from 400 nm to 500 nm for a 520 nm reference wavelength. In the embodiment, the target transmission for all these wavelengths is set to 100%. The reflection zone may extend from 505 nm to 700 nm. This short-pass filter design is for the visible range which extends from 400 to 700 nm. However, the design method can be used for other wavelengths including a device which operates in the UV or infrared range. If this is required then the target for transmission and reflection zones would be altered as required. Also, as was stated earlier, the bandwidth of the reflection zone can be widened by increasing the number of paired layers. So if the design requires a wider bandwidth than is described above than the number of layers will have to be increased above 80. In this case the number of synthesis cycles in the needle optimization phase needs to be increased In the embodiment, the reflection target for all these wavelengths is 100% for the two polarizations. The 25° transmission target zone may extend from 400 nm to 485 nm. This is based on using half the cosine shift as described before. The reflection zone may then start at 490 nm and extends to 700 nm. The optimization in Essential Macleod and similar programs is based on calculations at a finite number of wavelengths within the reflection and transmission zones. The resolution of these points may be either 1 nm or up to 2 nm and may be the same in all cases. (For 1 nm setting this would mean there are one hundred target points between 400 nm and 500 nm). The transmittance and reflectance may be calculated as the mean of the p-polarization and s-polarization in all cases. In step 102 the weights of all these wavelengths can be left at the default value of one (all wavelengths matter the same), or a custom set can be input to the program.

Figure 12:
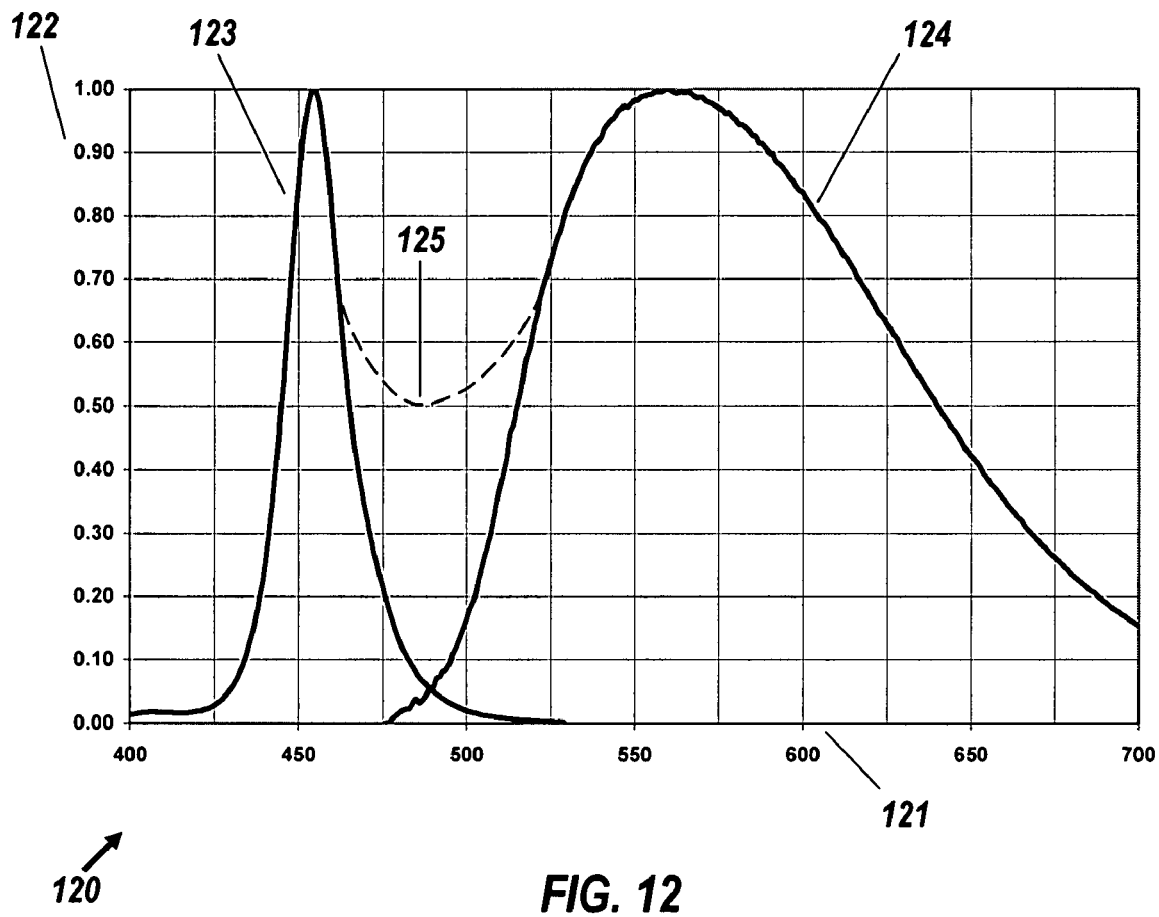
FIG. 12 shows a graph of nonuniform spectral weights.

FIG. 12 shows spectral graph 120 comprising horizontal wavelength scale 121 in nm and vertical scale 122 running from zero to one. Curve 123 shows the relative spectral distribution of a blue LED, while curve 124 shows that of a yellow phosphor. In one example, the weights are equal to curve 123 up to its peak, and beyond the peak as far as the beginning of dashed curve 125. The weights then follow dashed curve 125, which shows an example of non-unity weights in between the LED and phosphor peaks. At the long wavelength end, beyond the dashed curve 125, the weights would follow curve 124.

Once the seed formula and targets are entered, optimization is performed in step 103 using the known technique of the conjugate gradient. For those not familiar with this technique there is an excellent introduction to it in the article at the link http://en.wikipedia.org/wiki/Conjugate_gradient_method, which is incorporated herein by reference in its entirety. The optimization settings for a program such as Essential Macleod for deriving the interim design (as exemplified by the transmittance curve of FIG. 4) can be summarized as follows. The merit function power should be set to 2. A power of two means the merit function is proportional to the square of the weighted differences from target, or errors. The limiting range for the merit function should be 0.0001 or smaller. The maximum iterations should be set, to ensure that the program terminates if it cannot find a solution with an acceptably low merit value. The maximum number of iterations should be set to at least 1000 but, not usually much higher than 1000. The termination count should be set to 2. Once the interim design is calculated, any zero thickness layers or those less than 4 nm or 0.01 of the Full Wave Optical Thickness (FWOT) should be removed from the stack using the compacting feature of the software, shown as step 104 in FIG. 10. Their minor contributions can be mostly recovered by a subsequent conjugate gradient optimization, which will adjust the remaining layers to make up for those removed by compaction, although this is not shown.

Now the design is ready for needle synthesis, shown as step 105 in FIG. 10. The targets should remain the same as those described earlier. The settings for needle synthesis optimization are as follows. The merit power function, the limiting range for the merit function, the maximum number of iterations, and the termination match count should be set the same as for the conjugate gradient optimization. The number of synthesis cycles should be set high enough so that solutions are found for up to 100 layers (or more as is required). A good starting number is 10 synthesis cycles. The maximum number of new needles per pass should be set at 3, with a needle corresponding to one HLH layer from the original seed. A program such as Essential Macleod will save a number of the best designs. The designer may review them and decide which one best fits the actual goal specifications, as opposed to which ones have the lowest merit function. The merit function in the software is not always the best indicator, because in the process shown in FIG. 10 the target has been simplified by using 100% goals for each wavelength.

An alternative target is described below, which takes into account the relative importance of each wavelength and incidence angle. However, it was also found that if one increases the number and complexity of the targets quite often the software algorithms cannot find a regional optimum. It is therefore beneficial to start with the simple set of targets, arrive at a "high-quality" solution based on these targets and then perhaps add more constraints to see if there is a slightly better local optimum that improves on it.

FIG. 9 illustrates how the "real" theoretical performance of filter is assessed. A further example is provided in the concurrently-filed application, where there is an actual merit function for an optical system including the filter. Another way of assessing the real merit of the filter is to plug the filter design into a raytracing package such as Lightools or TracePro that can model the combined effects of the filter, the optics and other components of a system such as a phosphor.

It was found that the most practical solutions from a manufacturing and performance standpoint comprise from 70 to 86 layers. Typically, the solutions with more than 80 layers have many zero or near-zero thickness layers, and these can be compacted, in step 106 of FIG. 10. The 80-layer solution shown in Table 1 was derived from a compacted 86 layer solution found using needle synthesis. Once these very thin or zero layers are removed, then conjugate gradient optimization is used in step 107 of FIG. 10 to arrive at a final design. The spectral evaluation of step 108 comprises the following. When searching for a potential best solution one can search for the designs which have a number of thick high index layers. For example, the design in Table 1 has four layers of tantalum pentoxide greater than 300 nm thick. Those are layer 4, 8, 20, 30. Also there are no thin layers in the design. Designs having many thin layers can be more difficult to manufacture. The thinnest layer in this design is approximately 22 nm but most are much thicker. Designs with a number of thin layers (less than 10 to 15 nm) should not usually be considered.

Also, it is important to do an error calculation to see how sensitive a design is to variation in the index and thicknesses for the materials. Presently available manufacturing processes can typically meet a specification of 1% standard deviation of the thickness and index for both tantalum pentoxide and silicon dioxide. Processes are available that can guarantee ½% standard deviation for thin film coatings for these materials. FIGS. 6a and 6b illustrate the performance that should be attainable using standard quality equipment and processes available from the thin film industry. After step 108, a design is output at final step 110 of FIG. 10, or another round can be tried by step 109, changing the targets or the target weights.

An important property of the 80-layer design of Table 1 (and the family of filter designs derived from the methods described herein) is that the first layer in the stack nearest the medium can be varied in thickness without affecting its characteristics as a short-pass filter. It was found that the first layer of silicon dioxide can be freely modified from its thickness of approximately 94 nm to over 1000 nm without any significant change in performance. This makes it possible to design the first low index layer so that it can act as a TIR layer when coupled with the dielectric medium with a higher index (such as an adhesive).

A TIR layer will reflect light that is beyond the critical angle. For the case of $SiO_2$ and the highest index $Ta_2O_5$ this is $\sin^{-1}(1.46/2.14)=43°$. (In the designs disclosed in the present specification, the $Ta_2O_5$ has a refractive index of 2.046 for the reference wavelength of 520 nm and the critical angle is approximately 46°. The index of refraction of $Ta_2O_5$ varies as a function of its purity as well as other factors such as the deposition process and coating equipment that is used. Also the value changes as a function of the wavelength of light. Typically, each coater determines these values based on a combination of information for the supplier or manufacturer and the deposition process chosen for the production of the filter. It is common practice for those skilled in art of thin films that the wavelength variability of the index of the materials must be included in the design process, as is the case with the designs of Tables 1 to 4 below.) This property is useful for several applications involving light that is guided within the incident medium and traveling through the filter towards the substrate. In the conventional design the thin first layer (and other thin low index layers of the stack) allow evanescent coupling across itself, defeating to a large extent TIR. Evanescent fields decay rapidly with depth, so that any particular degree of decay, say 1%, would correspond to a particular thickness for the $SiO_2$ first low-index layer. For guided light at incidence angle $\theta$ in the medium (adjacent to the thick $SiO_2$ layer), the evanescent coupling strength, through a layer of lower index $n_1$ and thickness h, between a layer of refractive index no and one with the index $n_2$ is given by (Baumeister, p. 2-44)

$$T = 1/(1+F_{av})$$

$$F_{av} = (F_s + F_p)/2$$

$$\beta = 2\pi(h/\lambda)\sqrt{[(n_0 \sin\theta_0)^2 - n_1^2]}$$

This is the average for the two polarizations:

$$F_s = (1-A_s)^2 \cos h^2\beta + (B_s + C_s)^2 \sin h^2\beta$$

$$A_s = n_2 \cos\theta_2/n_0 \cos\theta_0$$

$$B_s = n_2 \cos\theta_2/n_1\gamma$$

$$\gamma = \sqrt{[(n_0 \sin\theta_0/n_1)^2 - 1]}$$

$$C_s = n_1\gamma/n_0 \cos\theta_0$$

$$F_p = (1-A_p)^2 \cos h^2\beta + (B_p + C_p)^2 \sin h^2\beta$$

$$A_p = n_2 \sec\theta_2/n_0 \sec\theta_0$$

$$B_p = \gamma n_2 \sec\theta_2/n_1$$

$$C_p = n_1/\gamma n_0 \sec\theta_0$$

For the case where light is guided within the medium (n=1.52) at an incident angle of 75° then $n_0=1.52$, $\theta_0=75°$, $n_1=1.46$, $n_2=2.046$, and $\theta_2=44°$. Solving for T=0.01 (where T is the proportion of the incident light that is transmitted by the evanescent wave) using the above equations from Baumeister, we determine that $h/\lambda=1.59$, which for blue light ($\lambda=460$ nm) amounts to h=730 nm. This means that the first thick $SiO_2$ layer must be 730 nm thick to reduce the transmission of a 75° angle of incidence 460 nm blue light to 1% or less. Blue LEDs typically have a maximum wavelength of approximately 515 nm. So a more conservative value using Baumeister's equations for h is 820 nm.

The above calculation utilized Baumeister's set of formulae for a three layer system, which does not take into account the effect on transmittance of the remaining layers in the stack. In reality a more complex model is required to accurately determine the transmission. Using the Macleod software the entire stack of the filter and not just the first three layers can be analyzed. This software indicates that a thickness for the first layer of approximately 1200 nm is needed to reduce the transmission to below 1% for the visible wavelengths. This is because in the full range of wavelengths and angles, the filter's performance displays some periodic behavior so that extra thickness will ensure low transmittance for the entire range of angles and wavelengths. (A discussion of this periodic behavior, which is called resonant tunneling, is given in the book "Evanescent Waves from Newtonian Optics to Atomic Optic" by F. de Formel, Springer 2001, pages 22-29.) The value of approximately 1200 nm is also obtained using the simplified equation from Baumeister (two layers) for the case when $h/\lambda \gg 1$. In this instance the transmission is equal to $e^{(-2\beta)}$ (where $\beta$ is defined in the aforementioned equation from Baumeister for a three-layer system), which in this case for 1% transmission comes to a value of h of 1217 nm. Using this simplified two-layer Baumeister equation for determining the thickness requirements for a 2% transmission, one comes to a value for h of 1034 nm or nearly twice the wavelength for the maximum wavelength of blue, 515 nm. The 2% value is the preferred minimum transmission for incidence angles above the critical angle for the short-pass filter embodiments of this invention in the "blue" direction mentioned above (with the incident beam approaching the thick layer of the stack through a glue or cover layer, rather than through the remaining layers of the stack). Ideally the transmittance in this direction should be below 1% which for the case of the designs in Table 2 and Table 3, this is achieved when the thickness of the first SiO2 layer is greater than 1170 nm.

This design is shown in Table 2. Table 2 replicates the design from Table 1 except for the change in the thickness of the first layer in the stack (now 1200 nm) and a different material for the substrate. Table 3 shows an optimized thickness for the first layer after conjugate gradient is employed using the targets for incidence angles less than 30°. The value for the first layer is just over 1172 nm, very close to the original value of 1200 nm.

The glass medium adjacent to layer 1 may be bonded to the filter by an optically transparent adhesive, which may have a refractive index of 1.52. By sandwiching the filter between two materials each of which has a refractive index considerably greater than that of the adjacent layer of the filter, TIR is provided for light approaching from both sides. The primary purpose of the thick first layer is to insure that evanescent waves cannot jump across the filter. The thick layer 1 in Table 2 only improves the reflectance marginally (up to 10% for some wavelengths) over the design of Table 1. The design of Table 1 is quite good at reflecting light at high incidence angles. In order for the thick layer 1 of Table 2 to be effective, in the direction from the glass medium through the adhesive towards layer 1, it is desirable for the rays that enter the adhesive to propagate into the first layer of the filter as incoherent light. Layer 1 then acts as a spacer. The filter design may operate coherently even though the light from the LEDs and the phosphor is incoherent. Except in the thick layer, coherent operation does not detract from the operation of the filter.

The design set out in Table 2 works very well. It was determined, however, that a conjugate gradient optimization of this design could improve its performance slightly, on the order of 0.5%. The results of this conjugate gradient optimization are shown in Table 3. Note that the thickness of the first layer is now reduced to just under 1200 nm. The design of Table 3 was arrived at using the same target values as described earlier. Therefore, the 1200 nm guess was close to one of several local optimum solutions. In this case the 1200 nm was chosen to begin with as it is thick enough to eliminate losses arising from frustrated total internal reflection. It was found that in the embodiments the thickness had to be at least approximately twice the dominant wavelength of the longest wavelength in the system to reduce transmission by frustrated TIR to a reasonable level. For the phosphors used in the devices of the concurrently filed application, the dominant wavelength is between 550 and 570 nm, so a layer at least 1100 nm thick is needed to reduce the evanescent wave transmission to approximately 1% at high incidence angles (above 70°).

Table 4 shows a further embodiment of a filter according to the invention based on an 82 layer design. Except where specified, the materials are $SiO_2$ with a refractive index of 1.46132 and an extinction index of less than 0.00001, and $Ta_2O_5$ with a refractive index of 2.0462 and an extinction index of 0.00002 at the reference wavelength of 520 nm. Both the substrate underlying layer 82 and the medium overlying layer 1 are glass with a refractive index of 1.52016 at the reference wavelength of 520 nm. The geometric thickness is expressed in units of the reference wavelength of light (520 nm) in air. The optical thickness is expressed in units of the wavelength of the same light (520 nm) in the medium of the specific layer.

Figure 11A:
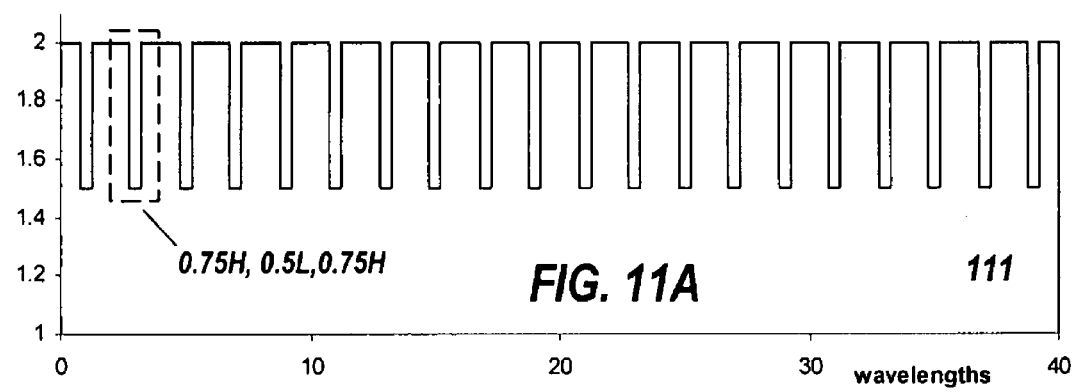
FIGS. 11A through 11D show graphs of four filters.
Figure 11B:
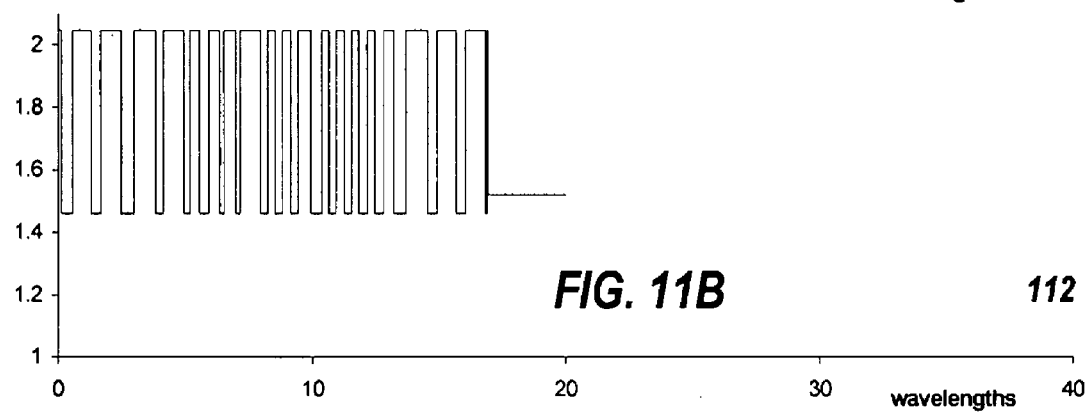
Figure 11C:
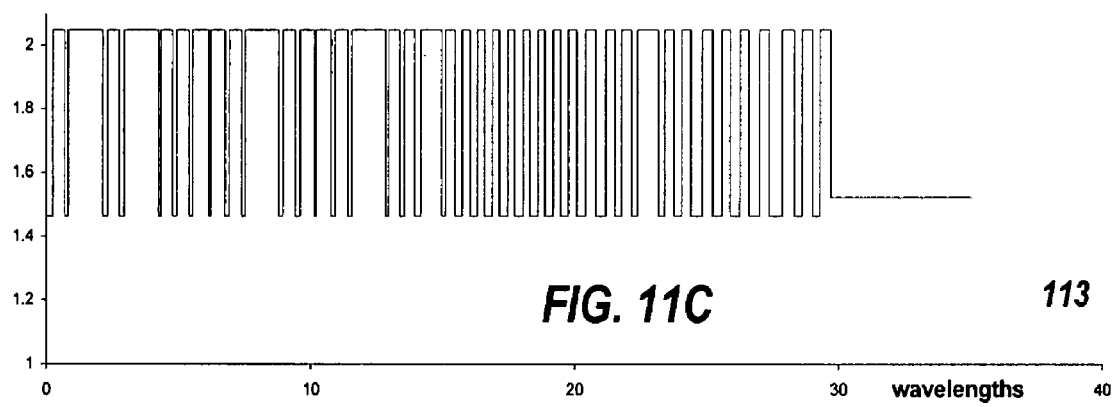
Figure 11D:
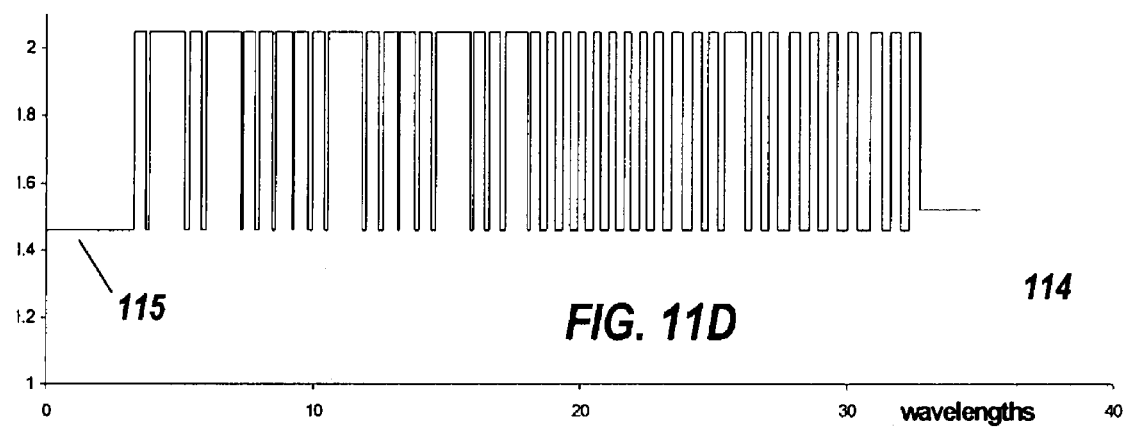

FIGS. 11A through 11D show in graphical form the structures of some of the filters disclosed herein. Graph 111 of FIG. 11A shows the refractive index distribution of the various layers of the seed filter of FIG. 1, their thicknesses expressed in terms of the reference wavelength within the material. The dashed box shows a single unit of the m=20 seed filter. Graph 112 of FIG. 11B shows in the same format the structure for the intermediate filter of FIG. 3 that was derived from the seed filter by the conjugate synthesis method. Graph 113 of FIG. 11C shows in the same format the filter of FIG. 5A. Graph 114 of FIG. 11D shows in the same format the filter with the thick first layer 115, for the aforementioned assurance of TIR of glancing-incidence guided rays.

Although specific embodiments have been described, various modifications may be made without departing from the spirit and scope of the invention as defined in the appended claims. For example, specific examples of filters have been described for selectively transmitting blue light from an LED and reflecting yellow light from a phosphor, with a cut-off between transmittance and reflectance at a reference wavelength of 520 nm. The examples set forth in Tables 1 to 4 use $SiO_2$ with a refractive index of 1.46132 and $Ta_2O_5$ with a refractive index of 2.0462 for the reference wavelength of 520 nm. The combination of $Ta_2O_5$ and $SiO_2$ is presently preferred, because it combines low mechanical stress in a stack with many layers and low absorption in the blue wavelengths used in the embodiments.

However, materials with different refractive indices may be used, and/or the cut-off may be set at a different reference wavelength, by scaling the physical thickness of the layers so as to keep constant the optical thicknesses of the layers. For example $SiO_2$ can be replaced with magnesium fluoride. Conjugate gradient optimization can also be performed on this new design to arrive at an even higher performing design. Typically, the number of layers in a stack of a material such as magnesium fluoride is limited as magnesium fluoride has a higher internal stress than silicon dioxide. Some modern coating techniques can reduce this and make it practical to use magnesium fluoride in an 80 or more layer design.) The optical thicknesses given in Tables 1 to 4 are Full Wave Optical Thickness (FWOT), where the FWOT of a layer is defined as the index of refraction of the material (at the reference wavelength) times the physical thickness divided by the reference wavelength.

The previously described merit function comprised a weighted sum of the squared deviations of a filter spectrum from the target, at the primary incidence angle of 15° upon the filter or, in step 101 of the example of FIG. 10, at the incidence angles of 15° and 25°. Other numbers of angles may be used in defining the merit function. For example, in the above-mentioned concurrently filed patent application, FIGS. 14, 15, and 16 respectively graphed the angular distribution of three different input light beams, each of which contributes differently to the white output luminosity. The entire angular range of zero to 30°, if represented relative to flux, can satisfactorily be reduced to evaluating the spectrum only at the four discrete angles of 10°, 15°, 20°, and 25°, since 5 and 30° each represent less than 1 percent of the total flux. The percentage allocations to the four angles in this example are 12.5% for 10°, 33.2% for 15°, 30.5% for 20°, and 23.8% for 25°. The merit function would then comprise summing the merit functions at these angles, as weighted by these percentages. In designing a filter for a different angular distribution, the composite merit function can easily be changed to accommodate the new filter goals. In each case the target spectrum would only be shifted by half the expected cosine effect.

Although the embodiments are directed to a short-pass filter, it is believed that a long-pass filter on the same principles can be generated by changing the target goals in the optimization process.

TABLE 1

SPECIFICATION OF 15° DICHROIC FILTER optimized for glass on both sides with index of 1.52, for a reference wavelength of 520 nm.

| Layer | Material | Optical Thickness (FWOT) | Physical Thickness (nm) |
|---|---|---|---|
| Medium Glass (index 1.52016) | | | |
| 1 | SiO2 | 0.264164 | 94.00 |
| 2 | Ta2O5 | 0.449233 | 114.16 |
| 3 | SiO2 | 0.124656 | 44.36 |
| 4 | Ta2O5 | 1.307223 | 332.2 |
| 5 | SiO2 | 0.188907 | 67.22 |
| 6 | Ta2O5 | 0.448459 | 113.97 |
| 7 | SiO2 | 0.183887 | 65.43 |
| 8 | Ta2O5 | 1.294322 | 328.93 |
| 9 | SiO2 | 0.087735 | 31.22 |
| 10 | Ta2O5 | 0.457809 | 116.34 |
| 11 | SiO2 | 0.126039 | 44.85 |
| 12 | Ta2O5 | 0.485605 | 123.41 |
| 13 | SiO2 | 0.113348 | 40.33 |
| 14 | Ta2O5 | 0.625342 | 158.92 |
| 15 | SiO2 | 0.062843 | 22.36 |
| 16 | Ta2O5 | 0.535336 | 136.04 |
| 17 | SiO2 | 0.169741 | 60.4 |
| 18 | Ta2O5 | 0.464952 | 118.16 |
| 19 | SiO2 | 0.123351 | 43.89 |
| 20 | Ta2O5 | 1.292052 | 328.35 |
| 21 | SiO2 | 0.138418 | 49.25 |
| 22 | Ta2O5 | 0.469835 | 119.4 |
| 23 | SiO2 | 0.169507 | 60.32 |

TABLE 1-continued

SPECIFICATION OF 15° DICHROIC FILTER optimized for glass on both sides with index of 1.52, for a reference wavelength of 520 nm.

| Layer | Material | Optical Thickness (FWOT) | Physical Thickness (nm) |
|---|---|---|---|
| 24 | Ta2O5 | 0.555836 | 141.25 |
| 25 | SiO2 | 0.066416 | 23.63 |
| 26 | Ta2O5 | 0.574226 | 145.93 |
| 27 | SiO2 | 0.157035 | 55.88 |
| 28 | Ta2O5 | 0.476249 | 121.03 |
| 29 | SiO2 | 0.146218 | 52.03 |
| 30 | Ta2O5 | 1.288547 | 327.46 |
| 31 | SiO2 | 0.107126 | 38.12 |
| 32 | Ta2O5 | 0.427757 | 108.71 |
| 33 | SiO2 | 0.174046 | 61.93 |
| 34 | Ta2O5 | 0.394724 | 100.31 |
| 35 | SiO2 | 0.213582 | 76 |
| 36 | Ta2O5 | 0.813509 | 206.74 |
| 37 | SiO2 | 0.117413 | 41.78 |
| 38 | Ta2O5 | 0.372484 | 94.66 |
| 39 | SiO2 | 0.265164 | 94.36 |
| 40 | Ta2O5 | 0.301024 | 76.5 |
| 41 | SiO2 | 0.28646 | 101.93 |
| 42 | Ta2O5 | 0.271136 | 68.9 |
| 43 | SiO2 | 0.304811 | 108.46 |
| 44 | Ta2O5 | 0.264185 | 67.14 |
| 45 | SiO2 | 0.310724 | 110.57 |
| 46 | Ta2O5 | 0.258614 | 65.72 |
| 47 | SiO2 | 0.315512 | 112.27 |
| 48 | Ta2O5 | 0.25972 | 66 |
| 49 | SiO2 | 0.312079 | 111.05 |
| 50 | Ta2O5 | 0.266624 | 67.76 |
| 51 | SiO2 | 0.304774 | 108.45 |
| 52 | Ta2O5 | 0.283904 | 72.15 |
| 53 | SiO2 | 0.290975 | 103.54 |
| 54 | Ta2O5 | 0.315063 | 80.07 |
| 55 | SiO2 | 0.32961 | 117.29 |
| 56 | Ta2O5 | 0.39388 | 100.1 |
| 57 | SiO2 | 0.381229 | 135.66 |
| 58 | Ta2O5 | 0.334847 | 85.09 |
| 59 | SiO2 | 0.26389 | 93.9 |
| 60 | Ta2O5 | 0.3568 | 90.67 |
| 61 | SiO2 | 0.241874 | 86.07 |
| 62 | Ta2O5 | 0.781276 | 198.55 |
| 63 | SiO2 | 0.245975 | 87.53 |
| 64 | Ta2O5 | 0.354218 | 90.02 |
| 65 | SiO2 | 0.289481 | 103.01 |
| 66 | Ta2O5 | 0.34612 | 87.96 |
| 67 | SiO2 | 0.434923 | 154.76 |
| 68 | Ta2O5 | 0.387296 | 98.42 |
| 69 | SiO2 | 0.350876 | 124.86 |
| 70 | Ta2O5 | 0.317394 | 80.66 |
| 71 | SiO2 | 0.370086 | 131.69 |
| 72 | Ta2O5 | 0.341444 | 86.77 |
| 73 | SiO2 | 0.395878 | 140.87 |
| 74 | Ta2O5 | 0.371005 | 94.28 |
| 75 | SiO2 | 0.493059 | 175.45 |
| 76 | Ta2O5 | 0.451129 | 114.65 |
| 77 | SiO2 | 0.303067 | 107.84 |
| 78 | Ta2O5 | 0.387119 | 98.38 |
| 79 | SiO2 | 0.286841 | 102.07 |
| 80 | Ta2O5 | 0.414657 | 105.38 |
| Total thickness | | 29.70267 | 8516 |
| Substrate glass (index 1.52) | | | |

TABLE 2

SPECIFICATION OF 15° DICHROIC FILTER with thick first layer, for a reference wavelength of 520 nm.

| Layer | Material | Physical Thickness (nm) |
|---|---|---|
| Medium Glass (index 1.52016) | | |
| 1 | SiO2 | 1200 |
| 2 | Ta2O5 | 114.16 |
| 3 | SiO2 | 44.36 |
| 4 | Ta2O5 | 332.2 |
| 5 | SiO2 | 67.22 |
| 6 | Ta2O5 | 113.97 |
| 7 | SiO2 | 65.43 |
| 8 | Ta2O5 | 328.93 |
| 9 | SiO2 | 31.22 |
| 10 | Ta2O5 | 116.34 |
| 11 | SiO2 | 44.85 |
| 12 | Ta2O5 | 123.41 |
| 13 | SiO2 | 40.33 |
| 14 | Ta2O5 | 158.92 |
| 15 | SiO2 | 22.36 |
| 16 | Ta2O5 | 136.04 |
| 17 | SiO2 | 60.4 |
| 18 | Ta2O5 | 118.16 |
| 19 | SiO2 | 43.89 |
| 20 | Ta2O5 | 328.35 |
| 21 | SiO2 | 49.25 |
| 22 | Ta2O5 | 119.4 |
| 23 | SiO2 | 60.32 |
| 24 | Ta2O5 | 141.25 |
| 25 | SiO2 | 23.63 |
| 26 | Ta2O5 | 145.93 |
| 27 | SiO2 | 55.88 |
| 28 | Ta2O5 | 121.03 |
| 29 | SiO2 | 52.03 |
| 30 | Ta2O5 | 327.46 |
| 31 | SiO2 | 38.12 |
| 32 | Ta2O5 | 108.71 |
| 33 | SiO2 | 61.93 |
| 34 | Ta2O5 | 100.31 |
| 35 | SiO2 | 76 |
| 36 | Ta2O5 | 206.74 |
| 37 | SiO2 | 41.78 |
| 38 | Ta2O5 | 94.66 |
| 39 | SiO2 | 94.36 |
| 40 | Ta2O5 | 76.5 |
| 41 | SiO2 | 101.93 |
| 42 | Ta2O5 | 68.9 |
| 43 | SiO2 | 108.46 |
| 44 | Ta2O5 | 67.14 |
| 45 | SiO2 | 110.57 |
| 46 | Ta2O5 | 65.72 |
| 47 | SiO2 | 112.27 |
| 48 | Ta2O5 | 66 |
| 49 | SiO2 | 111.05 |
| 50 | Ta2O5 | 67.76 |
| 51 | SiO2 | 108.45 |
| 52 | Ta2O5 | 72.15 |
| 53 | SiO2 | 103.54 |
| 54 | Ta2O5 | 80.07 |
| 55 | SiO2 | 117.29 |
| 56 | Ta2O5 | 100.1 |
| 57 | SiO2 | 135.66 |
| 58 | Ta2O5 | 85.09 |
| 59 | SiO2 | 93.9 |
| 60 | Ta2O5 | 90.67 |
| 61 | SiO2 | 86.07 |
| 62 | Ta2O5 | 198.55 |
| 63 | SiO2 | 87.53 |
| 64 | Ta2O5 | 90.02 |
| 65 | SiO2 | 103.01 |
| 66 | Ta2O5 | 87.96 |
| 67 | SiO2 | 154.76 |
| 68 | Ta2O5 | 98.42 |
| 69 | SiO2 | 124.86 |
| 70 | Ta2O5 | 80.66 |
| 71 | SiO2 | 131.69 |

TABLE 2-continued

SPECIFICATION OF 15° DICHROIC FILTER with thick first layer, for a reference wavelength of 520 nm.

| Layer | Material | Physical Thickness (nm) |
|---|---|---|
| 72 | Ta2O5 | 86.77 |
| 73 | SiO2 | 140.87 |
| 74 | Ta2O5 | 94.28 |
| 75 | SiO2 | 175.45 |
| 76 | Ta2O5 | 114.65 |
| 77 | SiO2 | 107.84 |
| 78 | Ta2O5 | 98.38 |
| 79 | SiO2 | 102.07 |
| 80 | Ta2O5 | 105.38 |
| Total thickness nm | | 9621.78 |
| Substrate Ohara PBM2Y (index 1.64) | | |

TABLE 3

SPECIFICATION OF 15° DICHROIC FILTER with thick first Layer and high index substrate - Optimized. For a reference wavelength of 520 nm.

| Layer | Material | Optical Thickness (FW) | Physical Thickness (nm) |
|---|---|---|---|
| Medium Glass (index 1.52016) | | | |
| 1 | SiO2 | 3.294544 | 1172.34 |
| 2 | Ta2O5 | 0.453105 | 115.15 |
| 3 | SiO2 | 0.115554 | 41.12 |
| 4 | Ta2O5 | 1.312515 | 333.55 |
| 5 | SiO2 | 0.181668 | 64.65 |
| 6 | Ta2O5 | 0.454386 | 115.47 |
| 7 | SiO2 | 0.178276 | 63.44 |
| 8 | Ta2O5 | 1.295143 | 329.13 |
| 9 | SiO2 | 0.076595 | 27.26 |
| 10 | Ta2O5 | 0.461416 | 117.26 |
| 11 | SiO2 | 0.139693 | 49.71 |
| 12 | Ta2O5 | 0.494367 | 125.63 |
| 13 | SiO2 | 0.108853 | 38.73 |
| 14 | Ta2O5 | 0.632527 | 160.74 |
| 15 | SiO2 | 0.073275 | 26.07 |
| 16 | Ta2O5 | 0.516255 | 131.2 |
| 17 | SiO2 | 0.166048 | 59.09 |
| 18 | Ta2O5 | 0.459759 | 116.84 |
| 19 | SiO2 | 0.120485 | 42.87 |
| 20 | Ta2O5 | 1.295123 | 329.13 |
| 21 | SiO2 | 0.145272 | 51.69 |
| 22 | Ta2O5 | 0.467058 | 118.69 |
| 23 | SiO2 | 0.167105 | 59.46 |
| 24 | Ta2O5 | 0.546826 | 138.96 |
| 25 | SiO2 | 0.065526 | 23.32 |
| 26 | Ta2O5 | 0.576811 | 146.58 |
| 27 | SiO2 | 0.149928 | 53.35 |
| 28 | Ta2O5 | 0.475386 | 120.81 |
| 29 | SiO2 | 0.162004 | 57.65 |
| 30 | Ta2O5 | 1.290078 | 327.85 |
| 31 | SiO2 | 0.113489 | 40.38 |
| 32 | Ta2O5 | 0.422965 | 107.49 |
| 33 | SiO2 | 0.17384 | 61.86 |
| 34 | Ta2O5 | 0.399308 | 101.48 |
| 35 | SiO2 | 0.206718 | 73.56 |
| 36 | Ta2O5 | 0.816412 | 207.47 |
| 37 | SiO2 | 0.098089 | 34.9 |
| 38 | Ta2O5 | 0.38185 | 97.04 |
| 39 | SiO2 | 0.261172 | 92.94 |
| 40 | Ta2O5 | 0.302322 | 76.83 |
| 41 | SiO2 | 0.289851 | 103.14 |
| 42 | Ta2O5 | 0.272644 | 69.29 |
| 43 | SiO2 | 0.299372 | 106.53 |
| 44 | Ta2O5 | 0.266796 | 67.8 |
| 45 | SiO2 | 0.309719 | 110.21 |
| 46 | Ta2O5 | 0.263113 | 66.86 |

TABLE 3-continued

SPECIFICATION OF 15° DICHROIC FILTER with thick first Layer and high index substrate - Optimized. For a reference wavelength of 520 nm.

| Layer | Material | Optical Thickness (FW) | Physical Thickness (nm) |
|---|---|---|---|
| 47 | SiO2 | 0.310277 | 110.41 |
| 48 | Ta2O5 | 0.261801 | 66.53 |
| 49 | SiO2 | 0.310382 | 110.45 |
| 50 | Ta2O5 | 0.269747 | 68.55 |
| 51 | SiO2 | 0.304496 | 108.35 |
| 52 | Ta2O5 | 0.282865 | 71.88 |
| 53 | SiO2 | 0.287176 | 102.19 |
| 54 | Ta2O5 | 0.325145 | 82.63 |
| 55 | SiO2 | 0.319789 | 113.79 |
| 56 | Ta2O5 | 0.402244 | 102.22 |
| 57 | SiO2 | 0.372109 | 132.41 |
| 58 | Ta2O5 | 0.342856 | 87.13 |
| 59 | SiO2 | 0.253781 | 90.31 |
| 60 | Ta2O5 | 0.362982 | 92.24 |
| 61 | SiO2 | 0.233227 | 82.99 |
| 62 | Ta2O5 | 0.793522 | 201.66 |
| 63 | SiO2 | 0.226974 | 80.77 |
| 64 | Ta2O5 | 0.361124 | 91.77 |
| 65 | SiO2 | 0.293101 | 104.3 |
| 66 | Ta2O5 | 0.339067 | 86.17 |
| 67 | SiO2 | 0.433278 | 154.18 |
| 68 | Ta2O5 | 0.386122 | 98.13 |
| 69 | SiO2 | 0.357264 | 127.13 |
| 70 | Ta2O5 | 0.316764 | 80.5 |
| 71 | SiO2 | 0.371986 | 132.37 |
| 72 | Ta2O5 | 0.344307 | 87.5 |
| 73 | SiO2 | 0.393522 | 140.03 |
| 74 | Ta2O5 | 0.375552 | 95.44 |
| 75 | SiO2 | 0.48701 | 173.3 |
| 76 | Ta2O5 | 0.435389 | 110.65 |
| 77 | SiO2 | 0.325682 | 115.89 |
| 78 | Ta2O5 | 0.364108 | 92.53 |
| 79 | SiO2 | 0.328316 | 116.83 |
| 80 | Ta2O5 | 0.403615 | 102.57 |
| Total thickness | | 32.72882 | 9589.31 |
| Substrate Ohara PBM2Y (index 1.64) | | | |

TABLE 4

| Layer | Material | (FWOT) | Physical Thickness (nm) | Geometric Thickness |
|---|---|---|---|---|
| Medium Glass (index 1.52016) | | | | |
| 1 | SiO2 | 0.271192 | 96.5 | 0.185579 |
| 2 | Ta2O5 | 0.449383 | 114.2 | 0.219619 |
| 3 | SiO2 | 0.123371 | 43.9 | 0.084424 |
| 4 | Ta2O5 | 1.307427 | 332.26 | 0.638954 |
| 5 | SiO2 | 0.188706 | 67.15 | 0.129133 |
| 6 | Ta2O5 | 0.449303 | 114.18 | 0.219579 |
| 7 | SiO2 | 0.181557 | 64.61 | 0.124241 |
| 8 | Ta2O5 | 1.294377 | 328.94 | 0.632576 |
| 9 | SiO2 | 0.086066 | 30.63 | 0.058896 |
| 10 | Ta2O5 | 0.458692 | 116.57 | 0.224168 |
| 11 | SiO2 | 0.128299 | 45.65 | 0.087797 |
| 12 | Ta2O5 | 0.485485 | 123.38 | 0.237262 |
| 13 | SiO2 | 0.112794 | 40.14 | 0.077186 |
| 14 | Ta2O5 | 0.626103 | 159.11 | 0.305983 |
| 15 | SiO2 | 0.062705 | 22.31 | 0.042909 |
| 16 | Ta2O5 | 0.534231 | 135.76 | 0.261084 |
| 17 | SiO2 | 0.170726 | 60.75 | 0.11683 |
| 18 | Ta2O5 | 0.4649 | 118.14 | 0.227202 |
| 19 | SiO2 | 0.123237 | 43.85 | 0.084332 |
| 20 | Ta2O5 | 1.29219 | 328.38 | 0.631507 |
| 21 | SiO2 | 0.138821 | 49.4 | 0.094997 |
| 22 | Ta2O5 | 0.470282 | 119.51 | 0.229832 |
| 23 | SiO2 | 0.168994 | 60.14 | 0.115644 |

TABLE 4-continued

| Layer | Material | (FWOT) | Physical Thickness (nm) | Geometric Thickness |
|---|---|---|---|---|
| 24 | Ta2O5 | 0.554281 | 140.86 | 0.270883 |
| 25 | SiO2 | 0.066367 | 23.62 | 0.045416 |
| 26 | Ta2O5 | 0.5751 | 146.15 | 0.281058 |
| 27 | SiO2 | 0.156034 | 55.52 | 0.106776 |
| 28 | Ta2O5 | 0.476187 | 121.01 | 0.232718 |
| 29 | SiO2 | 0.148165 | 52.72 | 0.101391 |
| 30 | Ta2O5 | 1.288473 | 327.44 | 0.629691 |
| 31 | SiO2 | 0.107516 | 38.26 | 0.073575 |
| 32 | Ta2O5 | 0.427536 | 108.65 | 0.208942 |
| 33 | SiO2 | 0.173591 | 61.77 | 0.11879 |
| 34 | Ta2O5 | 0.395505 | 100.51 | 0.193288 |
| 35 | SiO2 | 0.211964 | 75.43 | 0.145049 |
| 36 | Ta2O5 | 0.814157 | 206.9 | 0.397887 |
| 37 | SiO2 | 0.116718 | 41.53 | 0.079871 |
| 38 | Ta2O5 | 0.37371 | 94.97 | 0.182636 |
| 39 | SiO2 | 0.26461 | 94.16 | 0.181075 |
| 40 | Ta2O5 | 0.30106 | 76.51 | 0.147131 |
| 41 | SiO2 | 0.285858 | 101.72 | 0.195615 |
| 42 | Ta2O5 | 0.271104 | 68.9 | 0.132492 |
| 43 | SiO2 | 0.304719 | 108.43 | 0.208522 |
| 44 | Ta2O5 | 0.264757 | 67.28 | 0.12939 |
| 45 | SiO2 | 0.309604 | 110.17 | 0.211865 |
| 46 | Ta2O5 | 0.258972 | 65.81 | 0.126562 |
| 47 | SiO2 | 0.31581 | 112.38 | 0.216112 |
| 48 | Ta2O5 | 0.259765 | 66.01 | 0.12695 |
| 49 | SiO2 | 0.312063 | 111.05 | 0.213548 |
| 50 | Ta2O5 | 0.266691 | 67.77 | 0.130335 |
| 51 | SiO2 | 0.304968 | 108.52 | 0.208693 |
| 52 | Ta2O5 | 0.284064 | 72.19 | 0.138825 |
| 53 | SiO2 | 0.290628 | 103.42 | 0.19888 |
| 54 | Ta2O5 | 0.316569 | 80.45 | 0.154711 |
| 55 | SiO2 | 0.327194 | 116.43 | 0.223902 |
| 56 | Ta2O5 | 0.391724 | 99.55 | 0.19144 |
| 57 | SiO2 | 0.38143 | 135.73 | 0.261017 |
| 58 | Ta2O5 | 0.338078 | 85.92 | 0.165222 |
| 59 | SiO2 | 0.264239 | 94.03 | 0.180821 |
| 60 | Ta2O5 | 0.358376 | 91.07 | 0.175142 |
| 61 | SiO2 | 0.242854 | 86.42 | 0.166188 |
| 62 | Ta2O5 | 0.783385 | 199.08 | 0.382849 |
| 63 | SiO2 | 0.244237 | 86.91 | 0.167134 |
| 64 | Ta2O5 | 0.356479 | 90.59 | 0.174215 |
| 65 | SiO2 | 0.28885 | 102.78 | 0.197663 |
| 66 | Ta2O5 | 0.348669 | 88.61 | 0.170398 |
| 67 | SiO2 | 0.432857 | 154.03 | 0.296209 |
| 68 | Ta2O5 | 0.384848 | 97.8 | 0.188079 |
| 69 | SiO2 | 0.352282 | 125.36 | 0.24107 |
| 70 | Ta2O5 | 0.311959 | 79.28 | 0.152458 |
| 71 | SiO2 | 0.363949 | 129.51 | 0.249054 |
| 72 | Ta2O5 | 0.318639 | 80.98 | 0.155722 |
| 73 | SiO2 | 0.392297 | 139.6 | 0.268453 |
| 74 | Ta2O5 | 0.374965 | 95.29 | 0.183249 |
| 75 | SiO2 | 0.484534 | 172.42 | 0.331572 |
| 76 | Ta2O5 | 0.452891 | 115.09 | 0.221333 |
| 77 | SiO2 | 0.342098 | 121.73 | 0.234101 |
| 78 | Ta2O5 | 0.399403 | 101.5 | 0.195192 |
| 79 | SiO2 | 0.2378 | 84.62 | 0.162729 |
| 80 | Ta2O5 | 0.405055 | 102.94 | 0.197955 |
| 81 | SiO2 | 0.271192 | 107.46 | 0.206655 |
| 82 | Ta2O5 | 0.449383 | 105.52 | 0.202914 |
| Substrate Glass (index 1.52016) | | | | |
| Total Thickness | | 30.38167 | 8715.8 | 16.76115 |

The invention claimed is:

1. A shortpass filter comprising alternating layers of two materials, one of low index of refraction and the other of high index of refraction, the filter having an effective index of refraction of more than 95% of the index of refraction of the high index material over the operating wavelength of said filter.

2. A thin-film dichroic filter according to claim 1 to receive light over a range of small incidence angles from a medium, said filter comprising alternating thin-film layers of high and low refractive index on a substrate, the number and individual thicknesses of said layers specified by a design, said design determined by an optimization method comprising:
   providing a seed filter with formula (0.75H, 0.5L, 0.75H)^m, said m being 20 to 40;
   defining a target-spectrum with a desired edge-wavelength and at least one desired wavelength range, said edge-wavelength specifying the transition from transmittance to reflectance, said at least one desired wavelength range including a spectral transmittance range below said edge-wavelength and a spectral reflectance range above said edge-wavelength;
   optimizing the seed filter by a method comprising repeated steps of generating and evaluating a candidate filter design from the design of a previous step, said steps starting with said seed filter and concluding with said dichroic filter, said evaluating steps using a merit function comprising a weighted sum over said at least one wavelength range of the difference between said target-spectrum and the transmission spectrum of said candidate filter design.

3. The dichroic filter of claim 2, wherein said optimization method comprises successively applying a conjugate-gradient optimization, a needle synthesis, a compaction, and a further conjugate-gradient optimization.

4. The dichroic filter of claim 2, wherein said target spectrum comprises a first transmission spectrum for a first incidence angle within said range of small incidence angles and a second transmission spectrum for a second incidence angle within said range, the edge-wavelength of said second transmission spectrum having a wavelength shift that is 40 to 60% that of the cosine shift between said first incidence angle and said second incidence angle.

5. The dichroic filter of claim 4, wherein said target spectrum further comprises a third and a fourth transmission spectrum for a respective third and fourth incidence angle, said four incidence angles having weights summing to unity and representing the expected angular distribution upon said filter, wherein said target spectrum is the sum of the four said target spectra as combined by said weights.

6. The dichroic filter of claim 2, further comprising a first layer of said low refractive index receiving said light from said medium, said first layer at least two wavelengths thick, said first layer operable to prevent the transmission of light at high incidence angles.

7. The dichroic filter of claim 2, wherein said weights are all unit within said at least one desired wavelength range.

8. The dichroic filter of claim 7, wherein weights lower than said unit weight are given to wavelengths in a range between said range below said edge-wavelength and said range above said edge-wavelength.

9. A non-polarizing short-pass dichroic filter according to claim 2, wherein there are at least three layers of $Ta_2O_5$ thicker than 300 nm.

10. A dichroic filter according to claim 1, operable upon unguided light transiting therethrough, wherein an outermost layer of said low index of refraction material has its thickness increased to at least the 2% evanescent-wave coupling-decay depth.

11. A dichroic filter according to claim 10, comprising 80 consecutive layers, wherein at least 78 of the layers have optical thicknesses that are within 2% of the optical thickness of the corresponding layer in the filter of Table 2.

12. A dichroic filter according to claim 10, comprising consecutive layers, wherein at least 97% of the layers have optical thicknesses that are within 2% of the optical thickness of the corresponding layer in the filter of Table 3.

13. A dichroic filter according to claim 10, comprising consecutive layers having optical thicknesses that are within 2% of the optical thickness of the corresponding layer in the filter of Table 4.

14. A non-polarizing short-pass dichroic filter according to claim 1, consisting essentially of alternating layers of $Ta_2O_5$ and of a material having a refractive index not greater than $SiO_2$, the filter having an effective index of refraction greater than 1.95.

15. A filter according to claim 1, wherein the effective index of refraction $n_{eff}$ for unpolarized light is determined in accordance with the equation $$\lambda_\theta = \lambda_0 \sqrt{1 - \left(\frac{\sin(\theta)}{n_{eff}}\right)^2}$$

where: λhd 0 is the transition position on the spectral response curve at zero incidence angle; and $\lambda_\theta$ is the transition position on the spectral response curve at incidence angle θ.

16. A filter according to claim 15, wherein the filter is immersed in a dielectric, and the incidence angle θ is measured in the dielectric.

17. A thin-film dichroic filter, comprising alternating thin-film layers of two materials, one of low index of refraction and the other of high index of refraction on a substrate, the filter having an effective index of refraction of more than 95% of the index of refraction of the high index material over the operating wavelength of said filter to receive light over a range of small incidence angles from a medium, the number and individual thicknesses of said layers specified by a design, said design determined by an optimization method comprising:

providing a seed filter with formula (0.75H, 0.5L, 0.75H)^m, said m being 20 to 40;

defining a target-spectrum with a desired edge-wavelength and at least one desired wavelength range, said edge-wavelength specifying the transition from transmittance to reflectance, said at least one desired wavelength range including a spectral transmittance range below said edge-wavelength and a spectral reflectance range above said edge-wavelength;

optimizing the seed filter by a method comprising repeated steps of generating and evaluating a candidate filter design from the design of a previous step, said steps starting with said seed filter and concluding with said dichroic filter, said evaluating steps using a merit function comprising a weighted sum over said at least one wavelength range of the difference between said target-spectrum and the transmission spectrum of said candidate filter design;

wherein said weights are proportional to the spectral distribution of a combination of blue LED and yellow phosphor.

18. A dichroic filter comprising alternating layers of two materials, one of low index of refraction and the other of high index of refraction, the filter having an effective index of refraction of more than 95% of the index of refraction of the high index material over the operating wavelength of said filter comprising at least 78 layers having optical thicknesses that are within 2% of the optical thickness of layers in the same order in the filter of Table 1.

19. A non-polarizing short-pass dichroic filter comprising of an alternating stack of two materials, one of low index of refraction and the other of high index of refraction; wherein at least 3 percent of the high index layers of said filter have a thickness not less than 300 nm and the filter has an effective index of refraction greater than 1.95 and more than 95% of the index of refraction of the high index material over the operating wavelength of said filter.

* * * * *